US007571203B2

(12) United States Patent
Jeon et al.

(10) Patent No.: US 7,571,203 B2
(45) Date of Patent: Aug. 4, 2009

(54) PROCESSING DEVICE FOR A PSEUDO INVERSE MATRIX AND V-BLAST SYSTEM

(75) Inventors: In-San Jeon, Daejeon (KR); Hyuk Kim, Daejeon (KR); Jae-Seok Kim, Koyang (KR); Kyung-Soo Kim, Daejeon (KR); Hee-Bum Jung, Daejeon (KR); Jong-Dae Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1023 days.

(21) Appl. No.: 10/972,235

(22) Filed: Oct. 21, 2004

(65) Prior Publication Data

US 2005/0149596 A1 Jul. 7, 2005

(30) Foreign Application Priority Data

Dec. 22, 2003 (KR) .................... 10-2003-0094829

(51) Int. Cl.
*G06F 7/32* (2006.01)
(52) U.S. Cl. .................... 708/520; 708/607; 375/340
(58) Field of Classification Search ............... 708/570, 708/607; 375/340, 341
See application file for complete search history.

(56) References Cited

U.S. PATENT DOCUMENTS

| 7,296,045 | B2* | 11/2007 | Sehitoglu ................ 708/400 |
| 7,349,496 | B2* | 3/2008 | Jia et al. .................. 375/341 |
| 7,391,826 | B2* | 6/2008 | Claussen et al. ........... 375/340 |
| 2002/0191703 | A1* | 12/2002 | Ling et al. ............... 375/267 |
| 2003/0035491 | A1* | 2/2003 | Walton et al. ............ 375/267 |
| 2003/0043928 | A1* | 3/2003 | Ling et al. ............... 375/267 |
| 2003/0076908 | A1* | 4/2003 | Huang et al. ............. 375/350 |
| 2003/0161282 | A1* | 8/2003 | Medvedev et al. ........ 370/329 |
| 2003/0236080 | A1* | 12/2003 | Kadous et al. ........... 455/226.1 |

FOREIGN PATENT DOCUMENTS

| KR | 1020020032026 | 5/2002 |
| KR | 10200200794489 | 10/2002 |
| KR | 1020040053435 A | 6/2004 |

OTHER PUBLICATIONS

"V-Blast: An Architecture for Realizing Very High Date Rates Over the Rich-Scattering Wireless Channel", P. Wolniansky, et al., 1998 IEEE, pp. 295-300.

* cited by examiner

*Primary Examiner*—Lewis A Bullock, Jr.
*Assistant Examiner*—Michael Yaary
(74) *Attorney, Agent, or Firm*—Blakely, Sokoloff, Taylor & Zafman LLP

(57) ABSTRACT

Disclosed is a V-BLAST system for a MIMO communication system.

In the V-BLAST system for a MIMO communication system, a pseudo inverse matrix calculator receives a channel transfer function matrix including channel information and produces a cofactor matrix and a determinant for a pseudo inverse matrix. A norm & minimum calculator calculates a minimum index for the cofactor matrix outputted from the pseudo inverse matrix calculator, a weight vector selector selects a row vector having the minimum index and calculates a transposed matrix for the row vector; an adder adds the transposed matrix to a received input symbol, and a subtractor subtracts the determinant to the output. A demapper performs a determined function operation to the output and produces estimated information.

18 Claims, 15 Drawing Sheets

PROCESSING DEVICE FOR A PSEUDO INVERSE MATRIX AND V-BLAST SYSTEM

CROSS REFERENCE TO RELATED APPLICATION

This application claims priority to and the benefit of Korea Patent Application No. 2003-94829 filed on Dec. 22, 2003 in the Korean Intellectual Property Office, the entire content of which is incorporated herein by reference.

BACKGROUND OF THE INVENTION (a) Field of the Invention

The present invention relates to a V-BLAST system used in the MIMO (Multiple Input Multiple Output) communication system. More specifically, the present invention relates to the V-BLAST system including a simple inverse matrix operation architecture and a processing device for a pseudo inverse matrix of a channel transfer function matrix, applicable to the V-BLAST system.

(b) Description of the Related Art

A wireless channel having a multipath is known to have much channel capacity. Thus, requests for a Multiple Input Multiple Output (MIMO) system have gradually increased. In the MIMO system, it is well known that rich multipath scattering is provided on a communication channel, when appropriate space-time processing is done. A Diagonal Bell Laboratories Layered Space-Time (D-BLAST) was proposed in 1996 by Foschini, which is applicable to the MIMO system. The D-BLAST utilizes multi-element antenna arrays at both transmitter and receiver, and an elegant diagonally layered coding structure in which code blocks are dispersed across diagonals in space-time. In an independent Rayleigh scattering environment, this processing structure leads to theoretical rates which grow linearly with the number of antennas (assuming an equal numbers of transmit and receive antennas) with these rates approaching 90% of Shannon capacity. However, the diagonal approach suffers from implementation complexities.

Thus, a Vertical Bell Laboratories Layered Space-Time (V-BLAST) method was proposed in 1998 by Wolniansky, which can embody a simplified version of D-BLAST.

FIG. 1 shows a general architecture of a MIMO communication system using a V-BLAST.

As shown in FIG. 1, the MIMO communication system comprises a transmitter 10 and a receiver 20.

The transmitter 10 comprises a serial-parallel converter 11 for converting serial constructed data to parallel constructed data, a modulator 12 for QPSK modulating the parallel data to symbols, and an antenna 13 for transferring the symbols through a channel.

The receiver includes an antenna 25 for receiving the symbols through the channel, a channel estimator 21 for determining a channel transfer function matrix including channel properties, a V-BLAST system 22 for receiving the channel transfer function matrix H including received channel properties and a received symbol r and performing operation processes to them, a demodulator 23 for QPSK demodulating the detected symbol, and a parallel-serial converter 24 for converting the parallel demodulated data to serial data and producing the received data.

Hereinafter, an algorithm applied to the V-BLAST system 22 is described in detail. To simplify the algorithm, the channel transfer function matrix H including the received channel properties is limited to a 4×4 matrix having 4 rows and 4 columns.

FIG. 2 shows a construction of a general V-BLAST system 22, the V-BLAST method is applied.

The V-BLAST system 22 comprises a pseudo inverse matrix calculator 200, a norm & minimum calculator 201, a zero forcing vector selector 202, a matrix shrinking unit 203, a first multiplier 204, a demapper 205, a multiplier 206, and switches SW1 and SW2.

Hereinafter, the processing of the V-BLAST system 22 is described.

The channel transfer function matrix H is obtained by a training sequence or estimating channel, but in the present invention, the channel transfer function matrix H is assumed to be calculated at the channel estimator 21 and inputted to the V-BLAST system 22, and a detailed explanation thereof is not described in this specification. Further, $H_{k_{i-1}}$ is a matrix of which columns k1, k2 . . . ki are "0".

First, the channel transfer function matrix H is inputted to the first switch SW1, and the first switch SW1 outputs the channel transfer function matrix H to the pseudo inverse matrix calculator 200. The pseudo inverse matrix calculator 200 calculates a Moore-Penrose pseudo inverse matrix H+ from the inputted matrix H, and outputs the pseudo inverse matrix H+. The pseudo inverse matrix H+ of the channel transfer function matrix H is as in the following Equation 1.

$$G_{i-1} = H^+ \qquad \text{[Equation 1]}$$

The pseudo inverse matrix H+ calculated from the pseudo inverse matrix calculator 200 is inputted to the norm & minimum calculator 201. The norm & minimum calculator 201 finds a norm which is a sum of elements squared in each rows of $G_1$ by using the following Equation 2, and produces a minimum index $k_1$ which is a minimum of the norms.

$$k_1 = \arg\min_j \|(G_1)\|_j^2 \qquad \text{[Equation 2]}$$

As such, the minimum index $k_1$ calculated by the norm & minimum calculator 201 is inputted to the zero forcing vector selector 202 and the matrix shrinking unit 203. The zero forcing vector selector 202 selects a row having is the minimum index k1, the jth rows, as a zero forcing vector (hereinafter, it is often referred to a 'weight vector'), as shown in Equation 3. That is, the zero forcing vector is a row vector composed of only the jth row.

$$w_{k_r} = (G_i)_{k_1} \qquad \text{[Equation 3]}$$

Further, the zero forcing vector selector 202 selects the zero forcing vector and calculates the selected transposed matrix $w_{k_1}^T$.

The multiplier 204 receives the transposed matrix and multiplies the transposed matrix $w_{k_1}^T$ by a received symbol $r_i$, and generates an output symbol as in the following Equation 4.

$$y_{k_r} = w_{k_r}^T r_i \qquad \text{[Equation 4]}$$

The output symbol is inputted to the demapper 205, and the demapper detects the output symbol by using a boundary condition, and can obtain estimated information $\hat{a}_{k_r}$ as in the following Equation 5.

$$\hat{a}_{k_r} = Q(y_{k_r}) \qquad \text{[Equation 5]}$$

Equation 5 is a kind of limiter function.

The output from the demapper 205 is inputted to the parallel-serial converter 24 for decoding, and is inputted to the multiplier 206. The multiplier receives the output from the demapper 205 and the column vector from the first switch SW1. The first switch SW1 has a function for selecting a column.

The column selected by the first switch SW1 is the column of the original matrix Hi which corresponds to the column with the minimum index calculated at the norm & minimum calculator 201.

The output from the multiplier 206 is inputted to the subtractor 207, and a new received symbol ri+1 is calculated according to the following Equation 6.

The estimated symbol is multiplied by the corresponding channel vector, and the multiplication result of the estimated symbol and the corresponding channel vector is subtracted from the original received symbol signal. Then, the components of the corresponding symbol are cancelled from the received symbol, and other components are left in the received symbol.

$$r_{i+1} r_i - \hat{a}_{k_r}(H)_{k_r}$$ [Equation 6]

Here, $r_i$ is a symbol vector received first, $\hat{a}_{k_r}(H)_{k_r}$ is a multiplication result of the estimated symbol $\hat{a}_{k_r}$ and a $k1_{th}$ vector $(H)_{k_r}$ of the received channel matrix. The $\hat{a}_{k_r}(H)_{k_r}$ indicates how the: $a_{k_r}$ component among the received symbols affects the received symbol through the channel. Therefore, $r_{i+1}$ means a received symbol of other components except the $a_{k_r}$ component.

Therefore, to detect other symbols by using $r_{i+1}$, the above process is repeated in the original received channel matrix except the $k_i$th channel vector. That is, the channel matrix except the $k_i$th channel vector is referred to $H_{\bar{k}_i}$, and its pseudo inverse matrix $G_{i+1}$ can be calculated according to Equation 7.

$$G_{i+1} = H_{\bar{k}_i}^{+}$$ [Equation 7]

In the same manner, the norm & minimum calculator 201 seeks a norm of each row of the $G_{i+1}$ matrix and finds a minimum of the norms according to Equation 8.

$$k_{i+1} = \arg\min_{j \notin \{k_1 \cdots k_i\}} \|(G_{i+1})_j\|^2$$ [Equation 8]

Here, a $(G_{i+1})_j$ matrix is the jth row of the $G_{i+1}$ matrix.

As such, in the V-BLAST system, the pseudo inverse matrix calculator for obtaining the pseudo inverse matrix of the channel transfer function matrix H requires the largest space among performing algorithms to embody the V-BLAST system.

In addition, in the general V-BLAST system, the pseudo inverse matrix for input to the pseudo inverse matrix calculator is directly operated. Generally, each element of the channel matrix is a complex number. Thus, a complex hardware is required to operate the pseudo inverse matrix for the channel matrix directly.

SUMMARY OF THE INVENTION

The objective of the present invention provides a processing device for a pseudo inverse matrix of a channel transfer function matrix by using an operation in a log domain and a Jacobian operation, capable of embodying a small sized hardware.

Another objective of the present invention provides a V-BLAST system capable of processing a channel transfer function matrix effectively.

To achieve the objective, one aspect of the present invention is a pseudo inverse matrix calculator for producing a pseudo inverse matrix of an input matrix. The pseudo inverse matrix calculator comprises: a Hermitian converter for finding a logarithmic converted matrix by using a predetermined log table and finding a Hermitian matrix $H^H$ of the logarithmic converted matrix; a first multiplier for producing a multiplication matrix of the logarithmic converted Hermitian matrix and the logarithmic converted matrix by using an operation in a log domain and a Jacobian operation; an inverse matrix calculator for producing a cofactor and a determinant of an inverse matrix for the multiplication matrix by using the operation in a log domain and a Jacobian operation; and a second multiplier for producing a pseudo inverse matrix of the cofactor, based on the cofactor for the inverse matrix and the Hermitian matrix $H^H$ by using the operation in a log domain and a Jacobian operation.

Further, the inverse matrix calculator can comprise a first multiplying unit for performing an operation to the multiplication matrix outputted from the first multiplier by using the operation in a log domain and a Jacobian operation; a second multiplying unit for performing an operation to the output from the first multiplying unit by using the operation in a log domain and a Jacobian operation and producing cofactor matrixes and determinants; a third multiplying unit for performing an operation to the output from the second multiplying unit by using the operation in a log domain and a Jacobian operation and producing cofactor matrixes and determinants; and a selector for selecting the cofactor matrix and the determinant from the cofactor matrixes and the determinants outputted from the first multiplying unit, the second multiplying unit, and the third multiplying unit, by using the predetermined control signal.

The first multiplying unit can comprise a first 4×4 matrix multiplier for performing a multiplication operation to a 4×4 matrix and producing a cofactor and determinant of a 2×2 matrix; and a first 3×3 matrix multiplier for performing a multiplication operation to a 3×3 matrix and producing a cofactor of a 3×3 matrix.

The second multiplying unit can comprise a second 4×4 matrix multiplier for receiving an output from the first 4×4 matrix multiplier, and producing a cofactor of the 4×4 matrix; and a second 3×3 matrix multiplier for receiving an output from the first 3×3 matrix multiplier, and producing a determinant of the 3×3 matrix.

Another aspect of the present invention is a pseudo inverse matrix calculator for producing a pseudo inverse matrix of a channel transfer function matrix H. The pseudo inverse matrix calculator comprises a log converter for applying logarithmic conversion to the channel transfer function matrix by using the predetermined log table; a producer for producing a pseudo inverse matrix H+ for the logarithmic converted channel transfer function matrix; and an inverse log converter for applying inverse logarithmic conversion to the pseudo inverse matrix produced from the producer by using a predetermined inverse log table.

The producer can comprise a Hermitian converter for finding a Hermitian matrix $H^H$ of a logarithmic converted channel transfer function matrix H; a matrix multiplier for producing a multiplication matrix A by using the Hermitian matrix $H^H$ and the logarithmic converted channel transfer function matrix; an inverse matrix multiplier for finding an inverse matrix $A^{-1}$ of the multiplication matrix; and a pseudo inverse matrix unit for producing the pseudo inverse matrix by using the inverse matrix $A^{-1}$ and the Hermitian matrix $H^H$.

The inverse matrix multiplier can produce a cofactor and a determinant of the inverse multiplication matrix $A^{-1}$ by using the addition operation and Jacobian operation for the multiplication matrix.

The pseudo inverse matrix unit can produce a cofactor Hc+ of the pseudo inverse matrix by using the addition operation of the cofactor and the Hermitian matrix $H^H$ and a Jacobian operation; and produces a determinant D of the pseudo inverse matrix by using the addition operation of the determinant and the Hermitian matrix $H^H$ and a Jacobian operation.

The inverse log converter can comprise a first inverse log converter for applying inverse logarithmic conversion to the cofactor Hc+ of the pseudo inverse matrix; and a second inverse log converter for applying inverse logarithmic conversion to the determinant D of the pseudo inverse matrix.

The matrix multiplier can perform the addition operation of the logarithmic converted matrix and the Hermitian matrix and a Jacobian operation and then; produce the multiplication matrix.

Another aspect of the present invention is a channel transfer function matrix processing method for a decoder in a receiver of a MIMO communication system. The channel transfer function matrix processing method comprises logarithmic converting a channel transfer function matrix H including communication channel information by using a predetermined log table; producing a pseudo inverse matrix of the logarithmic converted function matrix H; and inverse logarithmic converting the pseudo inverse matrix produced by using a predetermined inverse log table.

The stage for producing a pseudo inverse matrix can comprise finding the Hermitian matrix $H^H$ of the logarithmic converted function matrix H; producing the multiplication matrix A by using the addition operation of the log converted matrix and the Hermitian matrix $H^H$ and a Jacobian operation; finding the inverse multiplication matrix $A^{-1}$ for the multiplication matrix; and producing the pseudo inverse matrix by using the addition operation of the inverse multiplication matrix $A^{-1}$ and the Hermitian matrix $H^H$ and a Jacobian operation.

The stage for finding the inverse multiplication matrix can produce a cofactor and a determinant for the inverse matrix $A^{-1}$ by using the addition operation of the multiplication matrix and a Jacobian operation.

The stage for producing the pseudo inverse matrix can comprise producing a cofactor Hc+ for the pseudo inverse matrix by using the addition operation of the cofactor and the Hermitian matrix $H^H$ and a Jacobian operation; and produce a determinant D for the pseudo inverse matrix by using the addition operation of the determinant and the Hermitian matrix $H^H$ and a Jacobian operation.

Another aspect of the present invention is a V-BLAST system for a MIMO communication system. The V-BLAST system comprises: a pseudo inverse matrix calculator for receiving a channel transfer function matrix including channel information and producing a cofactor matrix and a determinant of a pseudo inverse matrix by using an operation in a log domain and a Jacobian operation; a norm & minimum calculator for calculating a minimum index for the cofactor matrix outputted from the pseudo inverse matrix calculator; a weight vector selector for selecting a row vector having the minimum index outputted from the norm & minimum calculator and calculating a transposed matrix for the row vector; an adder for adding the transposed matrix outputted from the weight vector selector to a received input symbol by using an operation in a log domain and a Jacobian operation; a subtractor for receiving the output from the adder and the determinant from the pseudo inverse matrix calculator and subtracting the determinant to the output; and a demapper for receiving the output from the subtractor and performing a predetermined function operation to the output and producing estimated information.

The pseudo inverse matrix calculator can comprise: a Hermitian converter for applying logarithmic conversion to the matrix by using a predetermined log table and finding a Hermitian matrix $H^H$ of the logarithmic converted matrix H; a first multiplier for producing a multiplication matrix of the Hermitian matrix and the logarithmic converted matrix by using an operation in a log domain and a Jacobian operation; an inverse matrix calculator for producing a cofactor and a determinant for an inverse matrix of the multiplication matrix by using the operation in a log domain and a Jacobian operation; and a second multiplier for producing a pseudo inverse matrix of the cofactor, based on the cofactor for the inverse matrix and the Hermitian matrix $H^H$ by using the operation in a log domain and a Jacobian operation.

The inverse matrix calculator can comprise: a first multiplying unit for performing an operation to the multiplication matrix outputted from the first multiplier by using the operation in a log domain and a Jacobian operation; a second multiplying unit for performing an operation to the output from the first multiplying unit by using the operation in a log domain and a Jacobian operation and producing cofactor matrixes and determinants; a third multiplying unit for performing an operation to the output from the second multiplying unit by using the operation in a log domain and a Jacobian operation and producing cofactor matrixes and determinants; and a selector for selecting the cofactor matrix and the determinant from the cofactor matrixes and the determinants outputted from the first multiplying unit, the second multiplying unit, and the third multiplying unit, by the predetermined control signal.

The norm & minimum calculator can comprise a Jacobian operator for performing a Jacobian operation to the cofactor matrix outputted from the pseudo inverse matrix calculator; and a minimum selector for receiving the output from the Jacobian operator and selecting a row having minimum.

The demapper can comprise an inverse log converter for applying inverse logarithmic conversion to the output from the subtractor; and a demapper for performing the predetermined function operation to the output from the inverse log converter and producing the estimated information.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
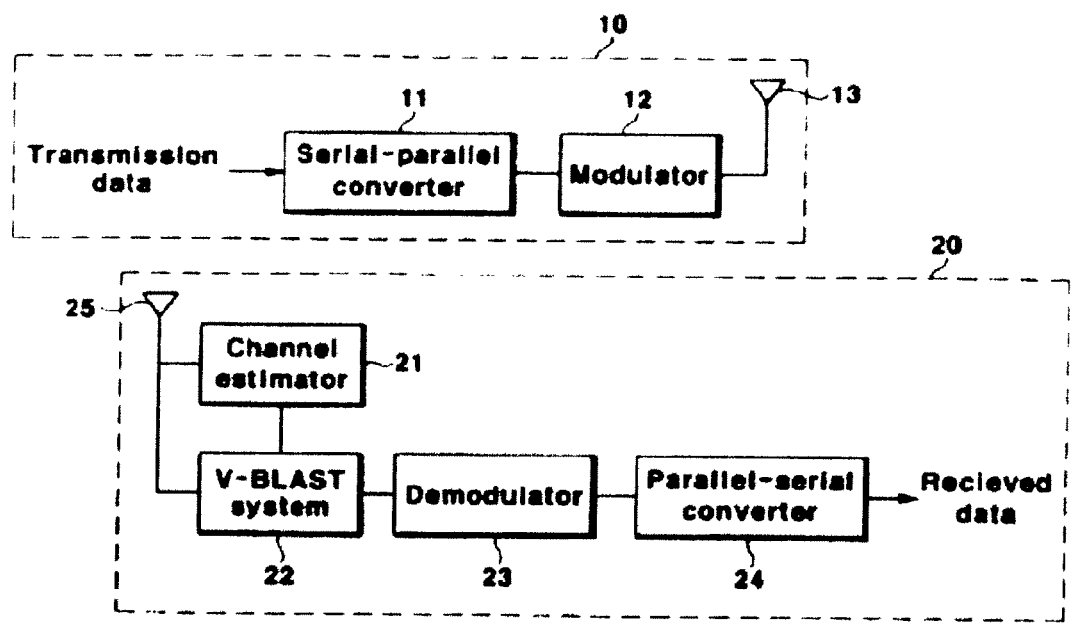
FIG. 1 shows a general architecture of a MIMO communication system using a V-BLAST.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 3:
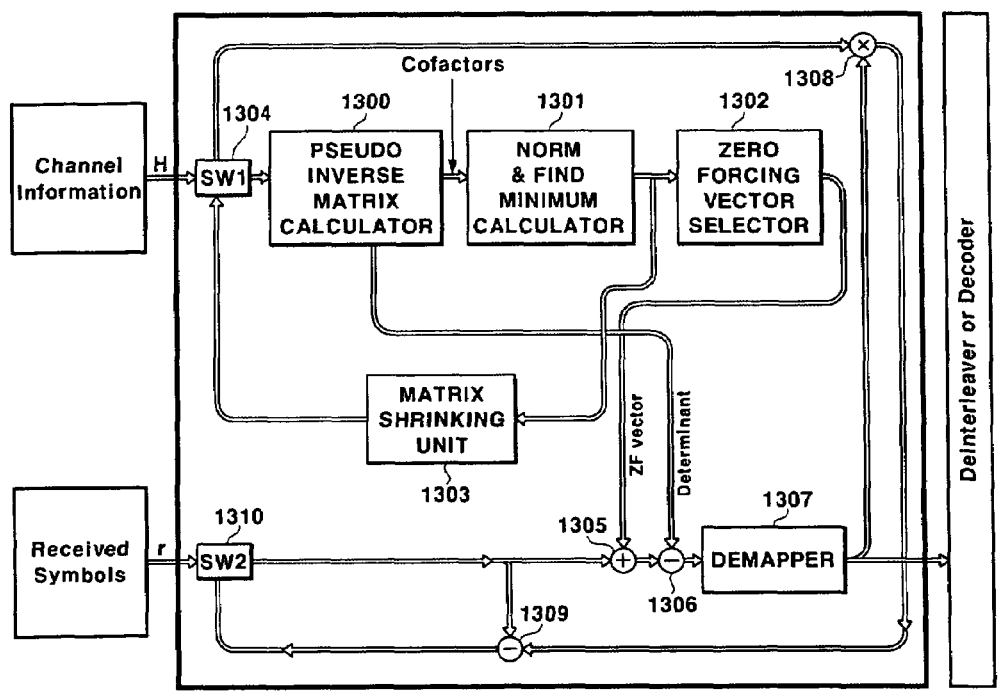
FIG. 3 is a block diagram showing a construction of a V-BLAST system according to the present invention.

FIG. 3 is a block diagram showing a construction of a V-BLAST system according to the present invention.

Figure 2:
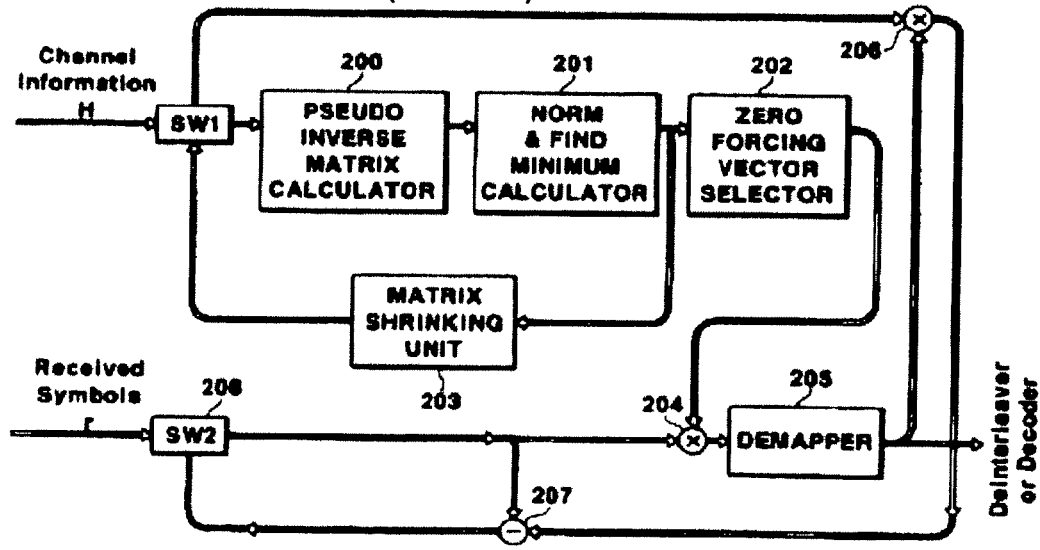
FIG. 2 shows a construction of a general V-BLAST system 22, in which the V-BLAST method is applied.

A construction of a V-BLAST system according to the present invention is the same as a construction of a general V-BLAST system shown in FIG. 2 except that the determinant and cofactors are respectively calculated by a proposed pseudo inverse matrix calculator 1300.

The V-BLAST system comprises the pseudo inverse matrix calculator 1300, and a norm & minimum calculator 1301, a zero forcing vector selector 1302, a matrix shrinking unit 1303, a multiplier 1308, a demapper 1307, an adder 1305, a subtractor 1306, and switches SW1 1304 and SW2 1310.

When a channel transfer channel transfer function matrix H including the channel information is inputted to the pseudo inverse matrix calculator 1300, an operator of the channel transfer function matrix, the pseudo inverse matrix, is obtained. Here, the determinant and the cofactor are respectively calculated.

A matrix multiplication operation is performed on the cofactors obtained from the pseudo inverse calculator 1300 and a logarithmic converted Hermitian matrix; and is inputted to the norm & minimum calculator 1301. A norm and minimum are calculated based on each row, and a minimum index is found.

The zero forcing vector selector 1302 selects a row having the minimum index k1 from the norm & minimum calculator 1301, which is the jth row, as the zero forcing vector.

The zero forcing vector composed from the cofactors is outputted to the adder 1305 and is added to the received symbol thereto.

Then a result of an addition operation of the zero forcing vectors and the received symbol is subtracted from the determinant in the log domain. That causes the same effect as the zero forcing vector is multiplied in the real domain.

Further, the minimum index is transferred to the matrix shrinking unit 1303. The matrix shrinking unit 1303 makes a new shrinking matrix in which a column corresponding to the minimum index is canceled from the present matrix. Next, calculation is performed by using the new shrinking matrix and is controlled by the switch 1 1304.

The demapper 1307 converts the result to the real domain, which the cofactors and the received symbol are added and the determinant is subtracted, and decodes the result to the first symbol. The decoded symbols are transferred to a deinterleaver or a decoder.

When the symbols obtained from the demapper 1307 are multiplied by the column corresponding to the minimum index in the channel information matrix at the multiplier 1308, the symbols corresponding to minimum elements among symbols received at each antenna are regenerated. When the symbols are subtracted from the received symbols, new symbols in which the minimum is canceled can be obtained. Next, calculation is performed by using the newly obtained received symbol, and is controlled by the switch 2 1310.

The above process is repeated until the last symbol is decoded by using the new channel information and new received symbols.

Hereinafter, an operation algorithm being performed in the V-BLAST system according to the present invention is described in detail.

First, the pseudo inverse matrix can be calculated according to the following Equation 9.

$$H^+ = (H^H \cdot H)^{-1} \cdot H^H \quad \text{[Equation 9]}$$

Here, the H+ means the pseudo inverse matrix of Moore-Penrose, and $H^H$ means a Hermitian matrix of the matrix H.

In the equation 9, though the matrix H is not square, the $H^H \cdot H$ becomes a square matrix. Thus the pseudo inverse matrix can be calculated by multiplying the inverse matrix of the square matrix obtained by the Hermitian matrix of the original matrix.

Here, the inverse matrix of the square matrix $(H^H \cdot H)^{-1}$ can be represented by the determinant and it's cofactors as in the following Equation 10.

$$(H^H \cdot H)^{-1} = \frac{1}{\Delta} \cdot A_{(H^H \cdot H)} \quad \text{[Equation 10]}$$

Then, the total pseudo inverse matrix is developed as in the following Equation 11.

$$H^+ = (H^H \cdot H)^{-1} \cdot H^H \quad \text{[Equation 11]}$$
$$= \left[\frac{1}{\Delta} \cdot A_{(H^H \cdot H)}\right] \cdot H^H$$
$$= \frac{1}{\Delta} \cdot [A_{(H^H \cdot H)} \cdot H^H]$$

Here, the determinant is regarded as a constant and thus can be located at the former part of the equation. Thus, $H^+$ can be represented by multiplying the inverse of the determinant and the inverse matrix of the square matrix A by $H^H$. When the result is introduced to the original algorithm, the 4×4 matrix received first can be represented as $G_{i=1}$ according to the following Equation 12.

$$G_{i-1} = H^+ \quad \text{[Equation 12]}$$
$$= \frac{1}{\Delta} \cdot [A_{(H^H \cdot H)} \cdot H^H]$$

Next, the norms, the sum of elements squared, are calculated from each rows of $G_1$, and the row having the smallest norm is referred to as $k_1$ as in the following Equation 13.

$$k_1 = \arg\min_j \|(G_1)\|_j^2 \quad \text{[Equation 13]}$$
$$= \arg\min_j \left\|\left(\frac{1}{\Delta} \cdot [A_{(H^H \cdot H)} \cdot H^H]\right)\right\|_j^2$$
$$= \frac{1}{\Delta^2} \cdot \arg\min_j \|([A_{(H^H \cdot H)} \cdot H^H])\|_j^2 \rightarrow$$
$$\arg\min_j \|([A_{(H^H \cdot H)} \cdot H^H])\|_j^2$$

Here, the determinant is a common element of each row, so an operation on the determinant is not required in the norm calculations. Thus, the norm calculations are performed only in the matrix composed of the cofactors. The row having the minimum is referred to the zero forcing vector, which is represented according to the following Equation 14.

$$w_{k_1} = (G_i)_{k_1} \quad \text{[Equation 14]}$$
$$= \left(\frac{1}{\Delta}[A_{(H^H \cdot H)} \cdot H^H]_i\right)_{k_1}$$

-continued
$$= \frac{1}{\Delta_i}([A_{(H^H \cdot H)} \cdot H^H]_i)_{k_1}$$

Here, although the determinant can be divided at the end of calculation, the same result can be produced. Thus, in the real embodiment of the hardware, the zero forcing vector operation is performed only to the rows extracted from the multiplication of the cofactors and the Hermitian matrix H, and then an inverse number of the determinant is multiplied by the result of the operation. A decision statistic can then be obtained by multiplying the transposed matrix of the zero forcing vector by the received symbol according to the following Equation 15.

$$y_{k_1} = w_{k_1}^T r_i \quad \text{[Equation 15]}$$
$$= \left(\frac{1}{\Delta}[A_{(H^H \cdot H)} \cdot H^H]_i\right)_{k_1}^T \cdot r_i$$
$$= \frac{1}{\Delta_i}([A_{(H^H \cdot H)} \cdot H^H]_i)_{k_1}^T \cdot r_i$$

Here, the ri is the received symbol, and the multiplication of $w_{k_r}^T$ and the ri becomes an input for the next end. The decision statistics can be estimated by the decision boundary condition according to the following Equation 16.

$$\hat{a}_{k_r} = Q(y_{k_r}) \quad \text{[Equation 16]}$$

As in the algorithm mentioned above, the estimated symbol multiplied by the corresponding channel vector is subtracted from the original received symbol signal. Then, the components for the corresponding symbol are cancelled, and other components are left in the received symbol. Other processes are the same as in the algorithm mentioned above.

The described operation process can reduce the number of dividers that are required to divide the cofactors by the determinant. For example, the number of dividers required is reduced from 16 to 1 in the 4×4 matrix.

Since repeated patterns occurring during calculation of the pseudo inverse matrix of the Moore-Penrose are canceled, hardware requirements can be reduced.

In the Equation 9, first ① the Hermitian matrix of H is found, and the Hermitian matrix of H is multiplied by the original H; ② the inverse matrix of the result of the multiplication is found; and ③ the inverse matrix of the result is multiplied by the Hermitian matrix of H.

Here, the result of ① is always a square matrix, and a circuit for calculating the inverse matrix for the square matrix is required. The inverse matrix of the matrix H is directly found by developing the 1st row in the matrix H by using the cofactors, with respect to each element according to the following Equation 17.

$$H^{-1} = \begin{bmatrix} h_{11} & h_{12} & h_{13} & h_{14} \\ h_{21} & h_{22} & h_{23} & h_{24} \\ h_{31} & h_{32} & h_{33} & h_{34} \\ h_{41} & h_{42} & h_{43} & h_{44} \end{bmatrix}^{-1} \quad \text{[Equation 17]}$$

-continued $$= \frac{1}{\Delta} \begin{bmatrix} A_{11} & A_{21} & A_{31} & A_{41} \\ A_{12} & A_{22} & A_{32} & A_{42} \\ A_{13} & A_{23} & A_{33} & A_{43} \\ A_{14} & A_{24} & A_{34} & A_{44} \end{bmatrix}$$

$$= \frac{1}{\Delta} \begin{bmatrix}
\begin{vmatrix} h_{22} & h_{23} & h_{24} \\ h_{32} & h_{33} & h_{34} \\ h_{42} & h_{43} & h_{44} \end{vmatrix} & -\begin{vmatrix} h_{12} & h_{13} & h_{14} \\ h_{32} & h_{33} & h_{34} \\ h_{42} & h_{43} & h_{44} \end{vmatrix} & \begin{vmatrix} h_{12} & h_{13} & h_{14} \\ h_{22} & h_{23} & h_{24} \\ h_{42} & h_{43} & h_{44} \end{vmatrix} & -\begin{vmatrix} h_{12} & h_{13} & h_{14} \\ h_{22} & h_{23} & h_{24} \\ h_{32} & h_{33} & h_{34} \end{vmatrix} \\
-\begin{vmatrix} h_{21} & h_{23} & h_{24} \\ h_{31} & h_{33} & h_{34} \\ h_{41} & h_{43} & h_{44} \end{vmatrix} & \begin{vmatrix} h_{11} & h_{13} & h_{14} \\ h_{31} & h_{33} & h_{34} \\ h_{41} & h_{43} & h_{44} \end{vmatrix} & -\begin{vmatrix} h_{11} & h_{13} & h_{14} \\ h_{21} & h_{23} & h_{24} \\ h_{41} & h_{43} & h_{44} \end{vmatrix} & \begin{vmatrix} h_{11} & h_{13} & h_{14} \\ h_{21} & h_{23} & h_{24} \\ h_{31} & h_{33} & h_{34} \end{vmatrix} \\
\begin{vmatrix} h_{21} & h_{22} & h_{24} \\ h_{31} & h_{32} & h_{34} \\ h_{41} & h_{42} & h_{44} \end{vmatrix} & -\begin{vmatrix} h_{11} & h_{12} & h_{14} \\ h_{31} & h_{32} & h_{34} \\ h_{41} & h_{42} & h_{44} \end{vmatrix} & \begin{vmatrix} h_{11} & h_{12} & h_{14} \\ h_{21} & h_{22} & h_{24} \\ h_{41} & h_{42} & h_{44} \end{vmatrix} & -\begin{vmatrix} h_{11} & h_{12} & h_{14} \\ h_{21} & h_{22} & h_{24} \\ h_{31} & h_{32} & h_{34} \end{vmatrix} \\
-\begin{vmatrix} h_{21} & h_{22} & h_{23} \\ h_{31} & h_{32} & h_{33} \\ h_{41} & h_{42} & h_{43} \end{vmatrix} & \begin{vmatrix} h_{11} & h_{12} & h_{13} \\ h_{31} & h_{32} & h_{33} \\ h_{41} & h_{42} & h_{43} \end{vmatrix} & -\begin{vmatrix} h_{11} & h_{12} & h_{13} \\ h_{21} & h_{22} & h_{23} \\ h_{41} & h_{42} & h_{43} \end{vmatrix} & \begin{vmatrix} h_{11} & h_{12} & h_{13} \\ h_{21} & h_{22} & h_{23} \\ h_{31} & h_{32} & h_{33} \end{vmatrix}
\end{bmatrix}$$

$$\Delta = h_{11}A_{11} - h_{12}A_{12} + h_{13}A_{13} - h_{14}A_{14}$$

$$= h_{11}\begin{vmatrix} h_{22} & h_{23} & h_{24} \\ h_{32} & h_{33} & h_{34} \\ h_{42} & h_{43} & h_{44} \end{vmatrix} - h_{12}\begin{vmatrix} h_{21} & h_{23} & h_{24} \\ h_{31} & h_{33} & h_{34} \\ h_{41} & h_{43} & h_{44} \end{vmatrix} + h_{13}\begin{vmatrix} h_{21} & h_{22} & h_{24} \\ h_{31} & h_{32} & h_{34} \\ h_{41} & h_{42} & h_{44} \end{vmatrix} - h_{14}\begin{vmatrix} h_{21} & h_{22} & h_{23} \\ h_{31} & h_{32} & h_{33} \\ h_{41} & h_{42} & h_{43} \end{vmatrix}$$

Here, all $h_{ij}$ are complex numbers, $\Delta$ is a determinant, and the development in the row direction and development in the column direction all show the same results. For example, the determinant of the above equation is to be developed for the first row.

The above equation is developed and repeated parts are cancelled, then the number of operators required is 36 2-input complex multipliers and 18 2-input complex subtractors. The number of operators here is regarded for the square matrix, and the ① and ③ are not regarded, since the ① and ③ are common.

The total algorithm of the V-BLAST is repeated, thus a first 4×4 matrix is reduced to one vector through a 3×3 matrix and a 2×2 matrix.

Thus, when the matrix is reduced to the 3×3 matrix, 12 of the complex multipliers and 6 of the complex subtractors are added in consideration of parts not overlapped with the 4×4 matrix. Thus, the total number of operators required is 48 of the 2-input complex multipliers and 24 of the 2-input complex subtractors. The complex multiplier is composed of 4 of the multipliers, 1 of the subtractors, and 2 of the adders in the real domain. Thus, the number of multipliers becomes a multiple of 4, so 192 of the multipliers are required.

Meanwhile, each element is symmetrically arrayed in the above equation. When an A1x and an A2x of the cofactor matrix are decomposed in the first row of the matrix, and a, A3x and a, A4x of the cofactor matrix are decomposed in the fourth row of the matrix, many repeated parts occur. The following example shows the repeated pattern of the 4×4 matrix, which are to be cancelled. The shadowed operations are repeated operation of the former operation.

$(h_{33}h_{44} - h_{34}h_{43}),(h_{32}h_{44} - h_{34}h_{42}),(h_{32}h_{43} - h_{33}h_{42})$
$(h_{33}h_{44} - h_{34}h_{43}),(h_{31}h_{44} - h_{34}h_{41}),(h_{31}h_{43} - h_{33}h_{41})$
$(h_{32}h_{44} - h_{34}h_{42}),(h_{31}h_{44} - h_{34}h_{41}),(h_{31}h_{42} - h_{32}h_{41})$
$(h_{32}h_{43} - h_{33}h_{42}),(h_{31}h_{43} - h_{33}h_{41}),(h_{31}h_{42} - h_{32}h_{41})$

-continued $(h_{13}h_{24} - h_{14}h_{23}),(h_{12}h_{24} - h_{14}h_{22}),(h_{12}h_{23} - h_{13}h_{22})$
$(h_{13}h_{24} - h_{14}h_{23}),(h_{11}h_{24} - h_{14}h_{21}),(h_{11}h_{23} - h_{13}h_{21})$
$(h_{12}h_{24} - h_{14}h_{22}),(h_{11}h_{24} - h_{14}h_{21}),(h_{11}h_{22} - h_{12}h_{21})$
$(h_{12}h_{23} - h_{13}h_{22}),(h_{11}h_{23} - h_{13}h_{21}),(h_{11}h_{22} - h_{12}h_{21})$ As such, when the cofactor decompositions for the first row and fourth row are performed, the number of the 2-input complex multipliers required is 24, and the number of the 2-input complex subtractors required is 12, so when the 3×3 matrix is considered again, the same number of operators are required as in the above case, although the overlapped parts are different. Thus, the total number of operators required is 36 of the 2-input complex multipliers and 12 of the 2-input complex subtractors. Since the number of the multipliers required becomes 144, 52 (about 25%) of the multipliers are reduced from the above case. In addition, 6 of the complex subtractors are reduced, and the total hardware requirement can be reduced.

Table 1 shows a comparison of development for the first row and the fourth row with development for the first row.

TABLE 1

|  | Cofactor decomposition for the $1^{st}$ row | Cofactor decomposition for the $1^{st}$ row and $4^{th}$ row | Reduction |
|---|---|---|---|
| 2-input complex multiplier | 48 | 36 | 12 (25%) |
| 2-input complex subtractor | 24 | 18 | 6 (25%) |

However, many complex multipliers and adders/subtractors are still required, and thus much hardware is needed. When the operations are performed in the log domain instead of the real domain, the multiplication and division in the real domain are converted to addition and subtraction in the log domain. Further, the addition and subtraction are calculated by a Jacobian operation. Thus, more hardware consumption can be reduced.

Hereinafter, the operation in the log domain and the Jacobian operation are described in detail.

I. Number expression in real domain and in log domain

In the case of a positive number:

Assuming that the number in the real domain and the log domain is a positive number, the following Equation 18 is developed.

$$A = \log_2 a \qquad \text{[Equation 18]}$$

The above equation can be represented according to the following Equation 19.

$$a = 2^A \qquad \text{[Equation 19]}$$

In the real domain, to emphasize that any number a is a real number, the a is defined according to the following Equation 20.

$$R(a) \qquad \text{[Equation 20]}$$

The above equation can be converted to the following Equation 21, applying the log domain is a domain to which the real domain is logarithmic converted.

$$\log_2 R(a) = R(\log_2 a) \qquad \text{[Equation 21]}$$

Here, the $\log_2 a$ can be referred to as A, and to emphasize that A is a log domain, A is defined according to the following Equation 22.

$$L(A) \qquad \text{[Equation 22]}$$

Generally, the a includes a decimal. Thus, when the a has only a decimal, A becomes a negative number.

Thus, the relationship as in the following Equation 23 can occur at each domain.

$$R(a) \Leftrightarrow L(A) \qquad \text{[Equation 23]}$$

In the case of negative number:

Generally, the logarithmic conversion of negative numbers is not mathematically defined. Thus, to expand the equations to negative numbers, a sign and size of the number can be separated. The indication of the negative number in the real domain is separately made by its sign and its size, according to the following Equation 24.

$$R(-,a) \qquad \text{[Equation 24]}$$

In the same manner, the indication by the real domain can be changed to the indication by log domain, according to the following Equation 25.

$$\log_2 R(-,a) = L(-,\log_2 a) \qquad \text{[Equation 25]}$$

Here, the $\log_2 a$ can be referred to as A, and to emphasize that A is a log domain, A is defined according to the following Equation 26.

$$L(-,A) \qquad \text{[Equation 26]}$$

Here, the A can be a negative number.

Thus, the following relationship can occur in each domain.

$$R(\pm,a) \Leftrightarrow L(\pm,A) \qquad \text{[Equation 27]}$$

Here, the a is a positive real number, and the A is a real number. In the relationship between them, the sign in the log domain is the same as that in the real domain, and the size in the log domain becomes the logarithmic conversion result applied to the absolute value of the size in the real domain. Here, the characters R and L indicate real domain and log domain, respectively.

For example, if the a is −4, the a can be written as R(−, 4). The A becomes 2, and the sign of A is '−'; and thus the A can be written as L(−,2). On the contrary, the real domain, R(−,4), can be obtained from log domain L(−,2). The value of the R(−,4) is −4.

Further, when the a is −0.25, the a can be written as R(−, 0.25). The A becomes −2, and the sign of A is '−'; and thus the A can be written as L(−,−2). On the contrary, the real domain, R(−,0.25), can be obtained from the log domain L(−,−2). The value of the R(−,0.25) is −0.25.

As such, the sign and the size are separated, since the logarithmic conversion result applied to the negative number is not defined.

In the general case:

The general expression including the positive number and the negative number is as in the follow Equation 28.

$$L(S_a, A) = L(\text{sign}(a), \log_2 a)$$

$$R(s_a, a) = R(\text{sign}(a), 2^A)$$

$$R(s_a, a) \Leftrightarrow L(S_a, A) \qquad \text{[Equation 28]}$$

As known in the above equation, the log domain can be the binary logarithmic conversion result applied to the real domain, and the real domain can be obtained by the exponential of 2 applied to the log domain. The sign of the real domain is the same as that of the log domain. The A is a real number including the positive number and the negative number, and the a is always a positive real number.

II. Addition and subtraction operation in the log domain

In the addition operation between two elements, the addition of R(±,a) and R(±,b) is expressed as in the following Equation 29.

$$R(+,a) + R(+,b) = R(+,a+b) = R(+,c)$$

$$R(+,a) + R(-,b) = R(+,a-b) \text{ for}(a \geq b)$$

$$R(-,a) + R(+,b) = R(-,a-b) \text{ for}(a \geq b)$$

$$R(-,a) + R(-,b) = R(-,a+b) = R(-,c) \qquad \text{[Equation 29]}$$

The subtraction operation can be regarded as the addition operation, when the sign of the later number b is changed to its opposite sign in the subtraction operation.

The operation corresponding to the above operation can be performed in the log domain. First, the addition of the two elements in the real domain is as in the following Equation 30.

$$R(+,c) = R(+,a) + R(-,b) \qquad \text{[Equation 30]}$$

The binary logarithmic conversion result to Equation 30 is as in the following Equation 31, assuming a≧b>0.

$$\log_2(R(+,c)) = \log_2(R(+,a) + R(-,b)) = L(+, \log_2(a-b)) \qquad \text{[Equation 31]}$$

The above equation can be expressed in the log domain as in the following Equation 32.

$$L(+, \log_2 c) = L(+, \log_2(a-b)) \qquad \text{[Equation 32]}$$

The above equation can be expressed by using the A, B, and C in the log domain as in the following Equation 33.

$$L(+,C) = L(+, \log_2(2^A - 2^B)) \qquad \text{[Equation 33]}$$

Here, the A is the logarithmic conversion result applied to the a, and the B is the logarithmic result applied to the b.

The addition of the a and the b in the real domain can be expressed as a Jacobian equation of the A and the B in the log domain.

The inverse logarithm (that is, exponential) applied to the final result, C, is the same as the result of calculation in the real domain as in the following Equation 34.

$$R(+,c) = R(+,2^C) = R\{+, 2^{\log_a(2^A - 2^B)}\} = R\{+, (2^A - 2^B)\} = R\{+, (2^{\log_a a} - 2^{\log_a b})\} = R\{+, (a-b)\} \qquad \text{[Equation 34]}$$

Here, the sign, '+' results from the assumption of a≧b>0, and the sign, '−' is because the sign of the b is '−'.

As such, the real domain is converted to the log domain by applying the binary logarithm, and the operation is performed in the log domain. The exponential result applied to the result from the operation in the log domain is the same as the result of the calculation in the real domain. The conversion of the real domain to the log domain in the addition operation makes operation more complex, however, the conversion of the real domain to the log domain in the multiplication operation changes the multiplication to addition. Thus, the amount of hardware required can be reduced.

For example, the addition of 4 and −0.25 in the real domain can be operated as follows.

$$R(+,c)=R(+,4-0.25)=R(+,3.75) \quad \text{[Equation 35]}$$

However, if the conversion of the real domain to the log domain is performed, the operation can be developed as follows.

$$L(+,C)=L\{+, \log_2(2^2-2^{-2})\}=L\{+,2+\log_2(1-2^{-4})\}=L\{+,2+\log_2 0.875\}=L\{+,2-0.1926\}=L(+,1.807)$$

$$R(+,c)=R(+,2^{1.807})=R(+,2^{1.0}+2^{0.807})=R(+,2+1.75)=R(+,3.75) \quad \text{[Equation 36]}$$

The calculation of the log and exponential can be performed by using a pre-calculated table.

General expression:

Generally, the addition and subtraction of the two real numbers $R(s_a, a)$ and $R(s_b,b)$ in the log domain can be operated according to the following Equation 37.

$$L(S_c,C)=L(\text{sign}(\max(a,b)), \log_2(2^{\max(A,B)} \pm 2^{\min(A,B)})) \quad \text{[Equation 37]}$$

The above equation can be changed to the simplified Jacobian operation by separating the sign and the size as in the following Equation 38.

$$S_c=\text{sign}(\max(a,b))$$

$$C=\max(A,B)+\log_2\{1\pm 2^{-|A-B|}\}=\max(A,B)+\log_2\{1\pm 2^{-(\max(A,B)-\min(A,B))}\} \quad \text{[Equation 38]}$$

Here, the sign, Sc, takes the sign of the a or the b, whichever is greater, and the size C can be obtained by an addition operation of the size of the A or the B whichever is greater, and the Jacobian operation for the difference between the A and the B. At this time, when the two signs are the same, a common Jacobian Table (JT) is used. Otherwise, when the sign, '−' is in the logarithm, the Jacobian operation is newly defined as a negative Jacobian operation, and a negative Jacobian table (NJT) is used. All cases that the two elements can have can be considered as in the following Table 2.

TABLE 2

| Operator | $S_a$ | $S_b$ | Sign | Jacobian |
|---|---|---|---|---|
| + | + | + | + | + |
| + | + | − | +@a >= b/−@a < b | −/− |
| + | − | + | −@a >= b/+@a < b | − |
| + | − | − | − | + |
| − | + | + | +@a >= b/−@a < b | −/− |
| − | + | − | + | + |
| − | − | + | − | + |
| − | − | − | −@a >= b/+@a < b | −/− |

As known in Table 2, when the signs including the operator are the same, the Jacobian operation becomes positive, and when the signs are different, the Jacobian operation becomes negative.

Generally, the properties of the positive Jacobian operation are well known, and an explanation thereof is not described. Hereinafter, the properties of the negative Jacobian operation are described.

$$L(S_c,C)=L(\text{sign}(\max(a,b)), \log_2(2^{\max(A,B)}-2^{\min(A,B)}))$$

$$S_c=\text{sign}(\max(a,b))$$

$$C=\max(A,B)+\log_2\{1-2^{-|A-B|}\}=\max(A,B)+\log_2\{1-2^{-(\max(A,B)-\min(A,B))}\} \quad \text{[Equation 39]}$$

As shown in Equation 39, the result by the calculation at the exponent of 2 is always a negative number except when the result is '0', when A=B. Thus, the range of the binary logarithmic conversion result is from '0' to negative infinity.

For example, the various calculation results in the real domain and the log domain are as shown in the following Table 3.

The signs in Table 3 depend on the signs of whichever has a greater size, including consideration of the operators. The sign in the Jacobian operation is positive when the signs are the same in consideration of the operators, and the sign in the Jacobian operation is negative when the signs are not the same in consideration of the operators.

For a special example, the negative infinity occurs in the negative Jacobian calculation when the sizes of the two elements for calculating are the same, as shown in Table 4.

The +/−b in Table 4 is the sign considering the sign of the operation. The sign in the Jacobian operation is positive when the signs are the same when the operator is considered, and the sign in the Jacobian operation is negative when the signs are different. The negative infinity is a negative maximum, and a lesser or equal value is considered as a saturation error.

TABLE 3

| Calculation in real domain | | | | Calculation in log domain | | | | | |
|---|---|---|---|---|---|---|---|---|---|
| a | b | +/− | c | Sign | A | B | Maximum | Jacobian | C | c |
| +4 | +2 | + | +6 | + | +2 | +1 | +2 | Pos, +0.586 | 2.585 | +6 |
| +4 | +2 | − | +2 | + | +2 | +1 | +2 | Neg, −1 | 1 | +2 |
| +4 | −2 | + | +2 | + | +2 | +1 | +2 | Neg, −1 | 1 | +2 |
| +4 | −2 | − | +6 | + | +2 | +1 | +2 | Pos, +0.586 | 2.585 | +6 |
| −4 | +2 | + | −2 | − | +2 | +1 | +2 | Neg, −1 | 1 | −2 |
| −4 | +2 | − | −6 | − | +2 | +1 | +2 | Pos, +0.586 | 2.586 | −6 |
| −4 | −2 | + | −6 | − | +2 | +1 | +2 | Pos, 0.586 | 2.586 | −6 |
| −4 | −2 | − | −2 | − | +2 | +1 | +2 | Neg, −1 | 1 | −2 |
| +0.25 | +0.5 | + | +0.75 | + | −2 | −1 | −1 | Pos, +0.586 | −0.414 | +0.75 |
| +0.25 | +0.5 | − | −0.25 | − | −2 | −1 | −1 | Neg, −1 | −2 | −0.25 |

TABLE 3-continued

| Calculation in real domain | | | | Calculation in log domain | | | | | |
|---|---|---|---|---|---|---|---|---|---|
| a | b | +/− | c | Sign | A | B | Maximum | Jacobian | C | c |
| +0.25 | −0.5 | + | −0.25 | − | −2 | −1 | −1 | Neg, −1 | −2 | −0.25 |
| +0.25 | −0.5 | − | +0.75 | + | −2 | −1 | −1 | Pos, +0.586 | −0.414 | +0.75 |
| −0.25 | +0.5 | + | +0.25 | + | −2 | −1 | −1 | Neg, −1 | −2 | −0.25 |
| −0.25 | +0.5 | − | −0.75 | − | −2 | −1 | −1 | Pos, +0.586 | −0.414 | −0.75 |
| −0.25 | −0.5 | + | −0.75 | − | −2 | −1 | −1 | Pos, 0.586 | −0.414 | −0.75 |
| −0.25 | −0.5 | − | +0.25 | + | −2 | −1 | −1 | Neg, −1 | −2 | +0.25 |

TABLE 4

| Calculation in real domain | | | Calculation in log domain | | | | | | |
|---|---|---|---|---|---|---|---|---|---|
| a | +/−b | c | Sign | A | B | Maximum | Jacobian | C | c |
| +4 | +4 | +8 | + | +2 | +2 | +2 | Pos, +1 | +3 | +8 |
| +4 | −4 | 0 | + | +2 | +2 | +2 | Neg, negative infinite | Negative infinite | 0 |
| −4 | +4 | 0 | + | +2 | +2 | +2 | Neg, negative infinite | Negative infinite | 0 |
| −4 | −4 | −8 | − | +2 | +2 | +2 | Pos, +1 | +3 | −8 |
| +0.5 | +0.5 | +1 | + | −1 | −1 | −1 | Pos, +1 | 0 | +1 |
| +0.5 | −0.5 | 0 | + | −1 | −1 | −1 | Neg, negative infinite | Negative infinite | 0 |
| −0.5 | +0.5 | 0 | + | −1 | −1 | −1 | Neg, negative infinite | Negative infinite | 0 |
| −0.5 | −0.5 | −1 | − | −1 | −1 | −1 | Pos, +1 | 0 | −1 |

III. Multiplication and division operation in log domain

In the multiplication operation of two elements, the multiplication of $R(\pm,a)$ and $R(\pm,b)$ is expressed as in the following Equation 40.

$R(+,a) \times R(+,b) = R(+,a \times b) = R(+,c)$ $R(+,a) \times R(-,b) = R(-,a \times b) = R(-,c)$ $R(-,a) \times R(+,b) = R(-,a \times b) = R(-,c)$ $R(-,a) \times R(-,b) = R(+,a \times b) = R(+,c)$ [Equation 40]

The operation corresponding to the above operation can be performed in the log domain. First, the multiplication of the two elements in the real domain is as in the following Equation 41.

$R(-,c) = R(+,a) \times R(-,b)$ [Equation 41]

The binary logarithm operation is applied to the Equation 41, the Equation 41 is converted to the log domain, and the multiplication is converted to addition as in the following Equation 42.

$\log_2(R(-,c)) = \log_2(R(+,a) \times R(-,b)) = \log_2(R(+,a)) + \log_2(R(-,b))$ [Equation 42]

The Equation 42 can be described in the log domain as in the following Equation 43.

$L(-, \log_2 c) = L(+, \log_2 a) + L(-, \log_2 b) = L((+)\cdot(-), \log_2 a + \log_2 b)$ [Equation 43]

The Equation 43 is expressed in the log domain by using A, B, and C as in the following Equation 44.

$L(-,C) = L(-,A+B)$ [Equation 44]

The A and B are the binary logarithmic conversion results of a and b.

As shown in the above equation, the multiplication of element a and element b in the real domain is expressed as the addition of element A and element B, and the sign is expressed as the multiplication of the sign of a and the sign of b. The multiplication for the signs can be easily expressed as a logic operator.

The inverse logarithm conversion, that is, exponential to the C is the same as the result of calculation in real domain as in the following Equation 45.

$R(-,c) = R(-,2^C) = R(-,2^{(A+B)}) = R(-,2^A \times 2^B) = R(-,2^{\log_1 a} \times 2^{\log_1 b}) = R(-,a \times b)$ [Equation 45]

Here, the sign is '−'.

As such, the real domain is converted to the log domain by applying the binary logarithm, and the operation is performed in the log domain. The inverse logarithm (that is exponential) applied to the result from the operation in the log domain has the same result as calculation in the real domain. The conversion from the real domain to the log domain in the multiplication operation changes the multiplication to addition. Thus, the amount of hardware required can be reduced.

For example, the multiplication of 4 and −0.25 in the real domain can be operated as follows.

$R(\text{sign}, c) = R(-,4 \times 0.25) = R(-,1.0)$ [Equation 46]

When the conversion from the real domain to the log domain is performed to the Equation 46, the operation can be developed as follows.

$L(\text{sign},C) = L[\{\text{sign}(a) \times \text{sign}(b)\}, \{\log_2(2^2) \times \log_2(2^{-2})\}] = L[-,(2-2)] = L(-,0)$ $R(\text{sign},c) = R(-,2^0) = R(-,1.0)$ [Equation 47]

The calculation of the log and exponential in Equation 47 can be performed by using the pre-calculated table.

The general equation for the multiplication and division in the log domain can be written as in the following Equation 48.

$L(S_c,C) = L(S_a S_b, A \pm B)$ [Equation 48]

As such, the multiplication is converted to addition and the division is converted to subtraction. The signs become the multiplication of two signs in the two real numbers.

As such, the calculation results in the log domain and the real domain the are same, but the size and the needed power of the hardware can be reduced by using the calculation for the log domain. The effect can be more remarkable as the operation becomes more complex and the assignment of bits to the hardware is increased.

IV. Complex operation in log domain

Complex addition and subtraction operation

The complex number is separated into the real part and the imaginary part for the complex addition and subtraction. The complex addition and subtraction operations are performed by using the Jacobian Table (JT) and the Negative Jacobian Table (NJT).

Complex multiplication operation (1): Multiplication in the log domain

The complex multiplication in the real domain is composed of the multiplications and additions as follows.

$$\{R(s_{ay}, a_r) + jR(s_{ai}, a_i)\} \times$$ [Equation 49]
$$\{R(s_{by}, b_y) + jR(s_{bi}, b_i)\} =$$
$$\{R(s_{ay}, a_r)R(s_{br}, b_y) - R(s_{ai}, a_i)R(s_{bi}, b_i)\} +$$
$$j\{R(s_{ay}, a_r)R(s_{bi}, b_i) + R(s_{ai}, a_i)R(s_{by}, b_y)\} =$$
$$\{R(s_{ay}s_{by}, a_yb_y) - R(s_{ai}s_{bi}, a_ib_i)\} +$$
$$j\{R(s_{ay}s_{bi}, a_yb_i) + R(s_{ai}s_{by}, a_ib_y)\} =$$
$$R(s_{cy}, c_y) + jR(s_{ci}, c_i)$$

Here, $S_{ar}$ is the sign of the $a_r$, and $a_r$ is the size of the real part of the complex a, and the cases of b and c are the same as the case of a. And $s_{ar}s_{br}$ means the multiplication of the sign bits $S_{ar}$ and $S_{br}$; and the same signs cause '+' but different signs cause '−'. These can be easily embodied in the hardware by using an XOR logic function assigning the '+' to the logic value '0' and assigning the '−' to the logic value '1'.

When the operation process corresponding to the operation process in the real domain is performed in the log domain, the logarithm operation to the complex number is required and the logarithm may cause complicated equations. Thus, the conversion to the log domain is required to be performed in the real part and imaginary part, respectively.

First, the complex number is separated into the real part and the imaginary part. The binary logarithm operation is applied to the real part and the imaginary part respectively, as in the following Equation 50.

$$\log_2 R(s_{ar},c_r) = \log_2 \{R(s_{ar}s_{br},a_rb_r) - R(s_{ai}s_{bi},a_ib_i)\}$$
$$\log_2 R(s_{ci},c_i) = \log_2 \{R(s_{ar}s_{bi},a_rb_i) + R(s_{ai}s_{br},a_ib_r)\}$$ [Equation 50]

The equations can be represented by the log domain as follows.

$$L(S_{cr},C_r) = L(s_{cr}, \log_2 c_r) = \log_2 \{L(s_{ar}s_{br}, 2^{A_r+B_r}) + L(-s_{ai}s_{bi}, 2^{A_i+B_i})\}$$

$$L(S_{ci},C_i) = L(s_{ci}, \log_2 c_i) = \log_2 \{L(s_{ar}s_{bi}, 2^{A_r+B_i}) + L(s_{ai}s_{br}, 2^{A_i+B_r})\}$$ [Equation 51]

The calculation for the equations is separated into a sign calculation and a size calculation. Since in the size of the elements, $A_r+B_r=C_{rr}$, $A_i+B_i=C_{ii}$, $A_r+B_i=C_{ri}$, and $A_i+B_r=C_{ir}$; and in the sign of the elements, $s_{ar}s_{br}=S_{crr}$, $-s_{ai}s_{bi}=S_{cii}$, $s_{ar}s_{bi}=S_{cri}$, and $s_{ai}s_{bi}=S_{cii}$, the equation can be converted to the following Equation 42.

$$L(S_{cr},C_r) = \log_2 \{L(S_{crr}, 2^{C_{ii}}) + L(S_{cii}, 2^{C_{ii}})\}$$

$$L(S_{ci},C_i) = \log_2 \{L(S_{cri}, 2^{C_{ii}}) + L(S_{cir}, 2^{C_{ii}})\}$$ [Equation 52]

Here, the sign $S_{cr}$ is the sign of the one having the larger size among $L(S_{crr}, 2^{C_{ii}})$ and $L(S_{cii}, 2^{C_{ii}})$, and in the case of the $S_{ci}$ being the same as the $s_{cr}$. The size, $c_r$ can be obtained from $\log_2|2^{C_{ii}} \pm 2^{C_{ii}}|$. And the sign in the Jacobian operation depends on the signs of the $S_{crr}$ and the $S_{cii}$, and the same signs cause '+' but different signs cause '−'. The size of $C_i$ is the same as the $C_r$.

Figure 4:
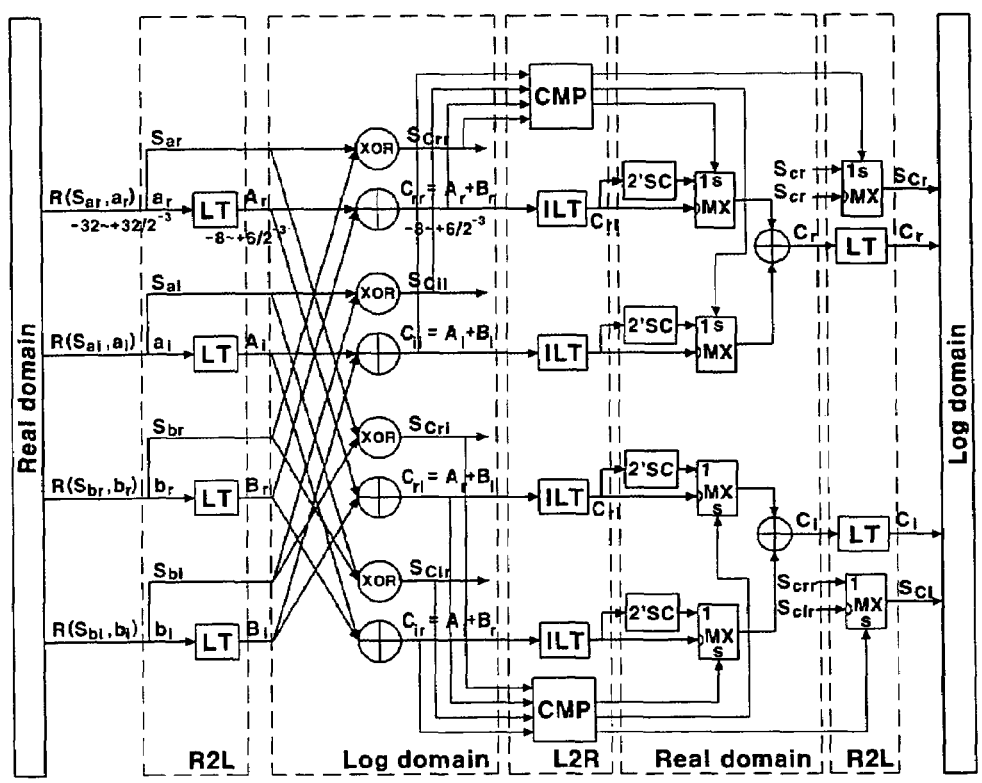
FIG. 4 shows architecture for complex multiplication from the real domain to the log domain.

General architecture of the hardware corresponding to the above process is shown in FIG. 4.

In the operation of the architecture, log domain can be obtained by performing the binary logarithm operation to each value of the real domain as in the following Equation 53.

$$A_r = \log_2 a_r, A_i = \log_2 a_i, B_r = \log_2 b_r, B_i = \log_2 b_i$$ [Equation 53]

These can be obtained by using the Log Table, R2L. The sign bits of each of the real domains are used as the sign bits of the log domain. The Scrr and Scii can be found by inputting the sign bits to the XOR logic function. The Crr and Cii in the log domain (corresponding to the multiplication in the real domain) are obtained by the adder. Their exponential is obtained by using an inverse log table, L2R. This means that the value in the log domain is converted to the real domain. The final sign, Scr, is the sign of the one having the bigger size among Crr and Cii by using a comparator (CMP) and a selector (Mux). The size in the real domain, cr, can be obtained by subtracting min(crr, cii) from max(crr, cii). This process can be easily performed by using a 2SC for a complement of 2, and a selector, i.e., a Mux adder. When the next end is the real domain, the calculation is completed. However, when the next end is the imaginary domain, the values are converted to the log domain by using the R2L.

In the above process, the multiplication operation is performed in the log domain using the addition operation, and the addition operation is performed in the real domain. This architecture is effective for the simple complex multiplier. However, this architecture is not suitable in the V-BLAST requiring many calculations in the log domain. Thus the complex multiplication using the improved architecture is performed in the log domain as follows.

Complex multiplication operation: All calculations are performed serially in the log domain The complex multiplication in the log domain is modified to the following equation 54 by using the predefined Jacobian operation. The Cr result is as follows.

$$L(S_{cr},C_r) = \log_2 \{L(S_{crr}, 2^{C_{ii}}) + L(S_{cii}, 2^{C_{ii}})\}$$ [Equation 54]

The equation is separated into the sign and the size, and the simplified Jacobian operation is applied thereto according to the following Equation 55.

$$S_{cr} = \text{sign}(\max(C_{rr}, C_{ii}))$$ [Equation 55]

$$C_r = \max(C_{rr}, C_{ii}) + \log_2\{1 \pm 2^{-|C_{ii}-C_{rr}|}\}$$

$$= \max(C_{rr}, C_{ii}) +$$

$$\log_2\{1 \pm 2^{-(\max(C_{ii},C_{rr})-\min(C_{ii},C_{rr}))}\}$$

The Scr is the sign of the final result equation, and is the sign of the Crr and Cii, whichever is greater. The size of the result can be obtained by adding the greater of Crr or Cii to the Jacobian operation for two elements. And the sign in the log domain is '+', when the sign of the Crr and the sign of the Cii are the same, and it is referred to the common Jacobian operation. Meanwhile, the sign in the log domain is '−' when the sign of the Crr and the sign of the Cii are different, and it is referred to the negative Jacobian table. The negative Jacobian table is used for the embodiment of the hardware as in the case of the common Jacobian operation.

Figure 5:
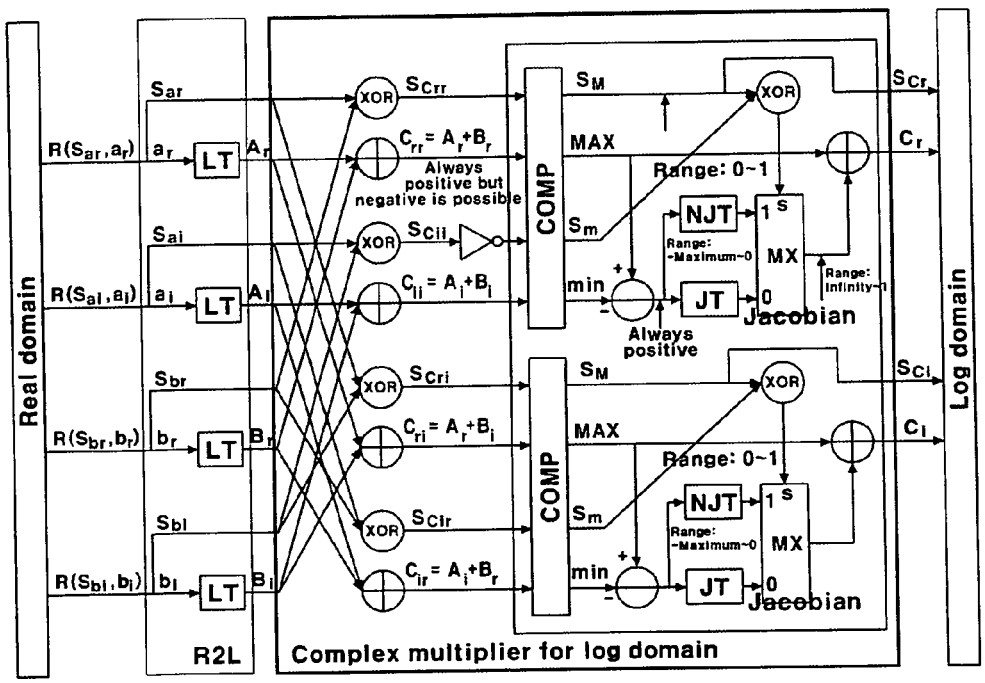
FIG. 5 shows a detailed diagram of a serial Jacobian operation for complex multiplication from the real domain to the log domain.

FIG. 5 shows an architecture using the common Jacobian operation and the negative Jacobian operation.

First, the binary logarithm operation is applied to each value of the real domain to obtain the value of the log domain.

$$A_r = \log_2 a_r, A_i = \log_2 a_i, B_r = \log_2 b_i, B_f = \log_2 b_i \quad \text{[Equation 56]}$$

These can be obtained by using the log table (LT). The Scrr and Scii can be obtained by using the XOR logic function. The Crr and Cii can be obtained by using the adder. The Scr and the sign of the Crr or Cii, whichever is is greater, can be obtained by using a comparator (CMP). The difference between the minimum and the maximum is calculated, and the JT (Jacobian Table) and NJT (Negative Jacobian Table) corresponding to the difference is found. The final Cr can be obtained by adding the JT or NJT to the maximum. Here, the JT is selected when signs of the two input signals are the same, and the NJT is selected when signs of the two input signals are different. The Ci can be obtained in the same manner. When there is no calculation in the log domain, the final real number can be obtained from the result by using the inverse log table (ILT).

Figure 6:
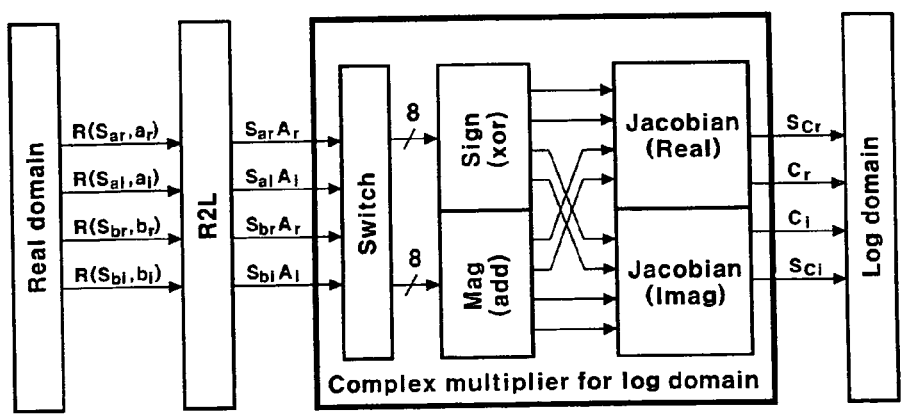
FIG. 6 is a block diagram of a serial Jacobian operation for complex multiplication from the real domain to the log domain

The above architecture can be simplified as in FIG. 6.

The above architecture is the case of a Jacobian operation having two elements, and the Jacobian operation can be defined as a 1st stage Jacobian operation. However, a multiple stage Jacobian operation can be defined when several elements are applied. The multiple stage Jacobian operation is described in the following multiplication for the complex matrix.

Complex multiplication operation: All calculation are performed in parallel in the log domain.

The equations are changed as in the following Equation 57 for constructing a parallel Jacobian operation.

$$S_M = \text{sign}(\max(C_{rr}, C_{ii})), S_M = \text{sign}(\min(C_{rr}, C_{ii})),$$

$$C_M = \max(C_{rr}, C_{ii}), C_m = \min(C_{rr}, C_{ii}) \quad \text{[Equation 57]}$$

Each element is separated into the integer part and decimal part. The equation for calculating the Jacobian operation is as follows. The equation can be given even when the number of elements is increased in the Jacobian operation.

$$S_{cr} = S_M$$

$$C_r = C_M + \log_2(2^{C_{mf}} \pm 2^{-(C_{mf} - C_{mi})} \times 2^{C_{mi}}) \quad \text{[Equation 58]}$$

Here, the $C_{Mi}/C_{mi}$ means the integer part of the $C_M/C_m$, and $C_{Mf}/C_{mf}$ means the decimal part of the $C_M/C_m$. The development of the equation can be made in the imaginary part.

Figure 7:
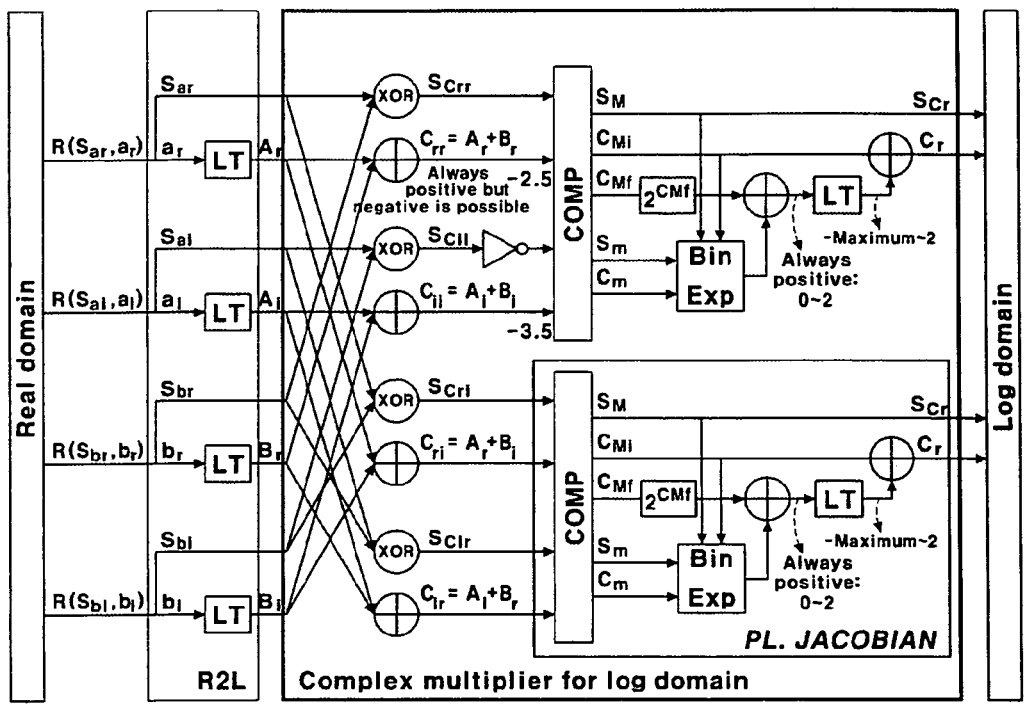
FIG. 7 shows a detailed diagram of a parallel Jacobian operation for complex multiplication from the real domain to the log domain

FIG. 7 shows an architecture using the modified parallel Jacobian operation.

As shown in FIG. 7, the conversion to the log domain and its addition operation is the same as the architecture using the serial Jacobian operation.

The maximum $C_M$ and minimum $C_m$ are determined in the comparator (COMP) regardless of their signs, and the signs $S_M$ corresponding to the $C_M$ and $S_m$ corresponding to the $C_m$ are determined.

Then, the $2^{C_{Mf}}$, the decimal part exponential to 2 is calculated for the maximum. And $2^{-(C_{mf} - C_{mf})} \times 2^{C_{mf}}$ can be embodied as the architecture shown in FIG. 8.

Figure 8:
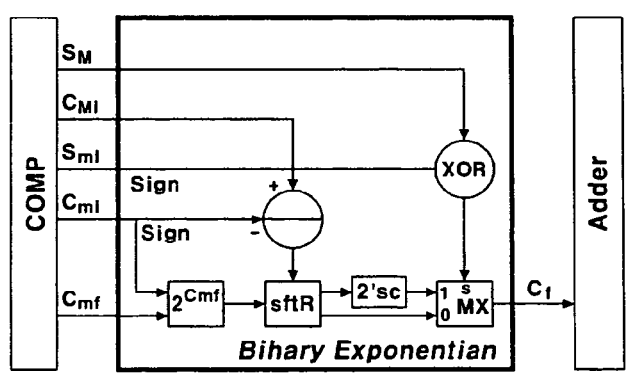
FIG. 8 shows a detailed diagram of a binary exponential calculator shown in FIG. 6.

As shown in FIG. 8, the decimal part exponential of 2 is calculated for the minimum. The decimal part exponential of 2 is required to be multiplied by the $2^{-(C_{mf} - C_{mf})}$. The multiplication result is the same as the result by the right shifting of the decimal part exponential of 2 by the $(C_{ddl} - C_{ml})$. The multiplication result can be embodied by using the shift register.

The complement of 2 for the result is obtained when the result is the negative Jacobian operation. However, the result is transferred to the next stage when the result is the positive Jacobian operation. Here, the positive Jacobian operation is Jacobian when the signs $S_M$ and $S_m$ are the same. And the negative Jacobian operation is Jacobian when the signs SM and Sm are different. The two results are added together, and the binary logarithmic conversion operation is applied to the addition result. The final result can be obtained by adding the $C_{Mi}$, the integer part of $C_M$, to the binary logarithmic conversion result.

Figure 9:
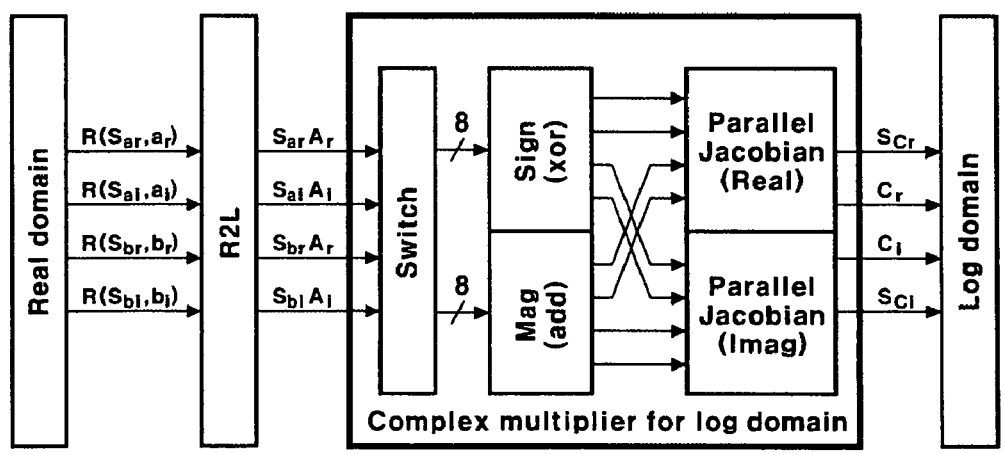
FIG. 9 is a block diagram of a parallel Jacobian operation for complex multiplication from the real domain to the log domain.

The block diagram showing the above result has the architecture including the parallel Jacobian operation as shown in FIG. 9.

V. Complex matrix operation in log domain

Complex matrix addition/subtraction operation

The complex matrix addition and subtraction are separately operated for the real part and imaginary part. However, the complex matrix addition and subtraction can be embodied by using the JT (Jacobian Table) and the NJT (Negative Jacobian Table), as the complex addition and subtraction described in the above. The complex matrix addition and subtraction are required to be operated in the location of each column and row.

Complex matrix serial multiplication operation

Generally, the complex matrix multiplication is composed of the multiplication of each complex elements and the addition thereto. Thus, to embody the complex matrix multiplication, the complex operation processes described above are applied and Jacobian operation for the result thereof is operated. That is, the serial architecture using the adder and several stages of Jacobian operation in the log domain is constructed.

First, each element of the matrix is converted in the log domain and the addition (corresponding to the multiplication operation in the real domain) is operated to get the result composed of the real part and the imaginary part. The result can be obtained by using the Jacobian operation (corresponding to the addition or subtraction operation) in the log domain.

The following process shows the multiplication operation process of a 1×2 complex matrix and a 2×1 complex matrix. Jacobian operation of this process is in serial and this process is effective for simple matrix calculation.

$$c = [a^1 \quad a^2] \times \begin{bmatrix} b^1 \\ b^2 \end{bmatrix} = a^1 \times b^1 + a^2 \times b^2 \quad \text{[Equation 59]}$$

$$c^1 = a\{R(+, a_r^1) + jR(+, a_i^1)\} \times \{R(+, b_r^1) + jR(+, b_i^1)\}$$

$$c^2 = \{R(+, a_r^2) + jR(+, a_i^2)\} \times \{R(+, b_r^2) + jR(+, b_i^2)\}$$

$$c = c^1 + c^2$$

The result of the binary logarithm applied to the equation is as follows.

$$C^1 = C_r^1 + jC_i^1 \quad \text{[Equation 60]}$$

$$= \log_2 c_r^1 + j\log_2 c_i^1$$

$$= \log_2\{R(+, a_r^1)R(+, b_r^1) -$$

$$R(+, a_i^1)R(+, b_i^1)\} +$$

$$j\log_2\{R(+, a_r^1)R(+, b_i^1) +$$

$$R(+, a_i^1)R(+, b_r^1)\}$$

-continued
$$C^2 = C_r^2 + jC_i^2$$
$$= \log_2 c_r^2 + j\log_2 c_i^2$$
$$= \log_2\{R(+, a_r^2)R(+, b_r^2) -$$
$$R(+, a_i^2)R(+, b_i^2)\} +$$
$$j\log_2\{R(+, a_r^2)R(+, b_i^2) +$$
$$R(+, a_i^2)R(+, b_r^2)\}$$

The variable used is converted to the variable in the log domain as follows. This constructs the Jacobian operation for the first stage.

$$C^1 = \log_2\{2^{L(+, A_r^1 + B_r^1)} - 2^{L(+, A_i^1 + B_i^1)}\} +$$
$$j\log_2\{2^{L(+, A_r^1 + B_i^1)} + 2^{L(+, A_i^1 + B_r^1)}\}$$

$$C^2 = \log_2\{2^{L(+, A_r^2 + B_r^2)} - 2^{L(+, A_i^2 + B_i^2)}\} +$$
$$j\log_2\{2^{L(+, A_r^2 + B_i^2)} + 2^{L(+, A_i^2 + B_r^2)}\}] \quad \text{[Equation 61]}$$

The final result, C, is obtained from the result of each multiplication as follows.

$$c = c^1 + c^2 = c_r^1 + c_r^2 + j(c_i^1 + c_i^2)$$

$$C = \log_2(c_r^1 + c_r^2) + j\log_2(c_i^1 + c_i^2) = \log_2(2^{c_r^1} + 2^{c_r^2}) + j\log_2(2^{c_i^1} + 2^{c_i^2}) \quad \text{[Equation 62]}$$

That is, the real part and the imaginary part are separated in the equation, and Jacobian operation is applied to the real part and the imaginary part separately. This constructs the Jacobian operation for the second stage.

Figure 10:
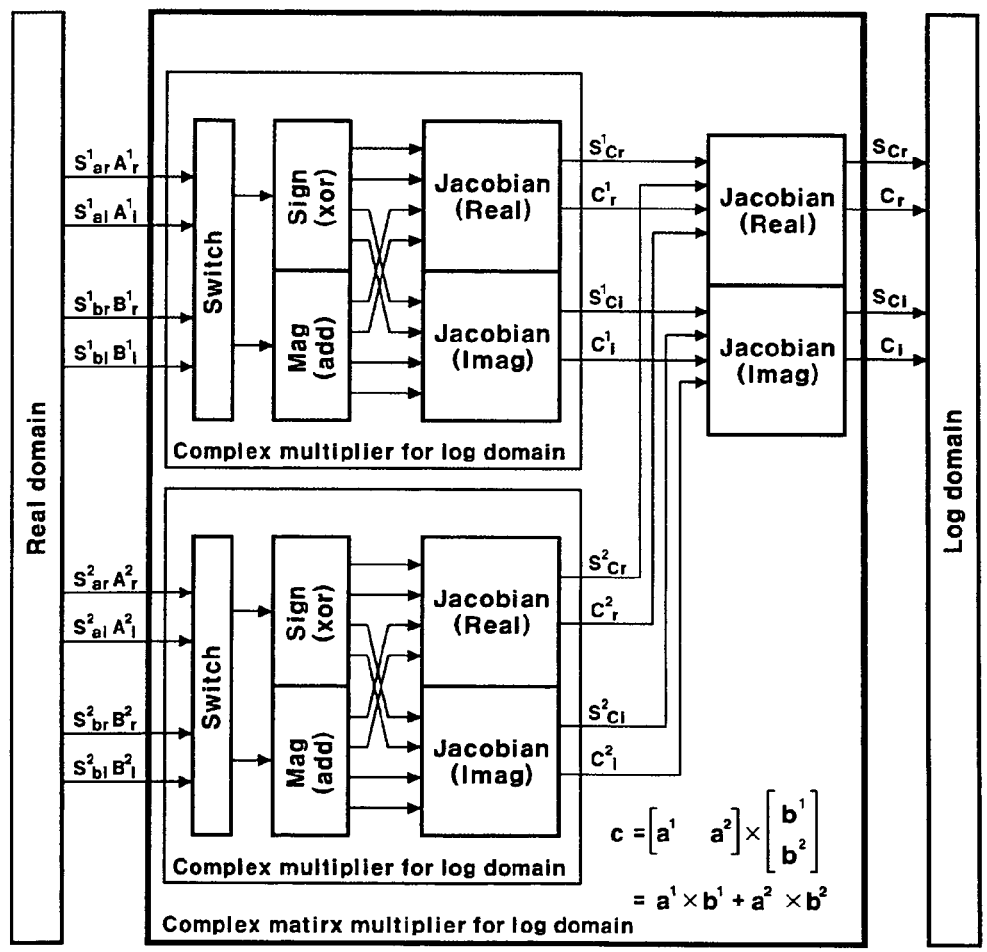
FIG. 10 shows architecture of a serial Jacobian operation for complex matrix multiplication.

FIG. 10 shows hardware architecture for the above process.

The results for each element are obtained by using the complex multiplier in the log domain. Jacobian operation is applied to the real part and the imaginary part of the results to produce the results by the complex matrix multiplication in the log domain. The architecture shows the serial Jacobian operation.

Complex matrix multiplication parallel operation

The smallest unit for the complex matrix multiplication to perform is composed of the complex multiplication operation and addition operation for the result from the complex multiplication operation. In the following process, all calculations are completed in the real domain, and the calculation results are converted to the log domain. In contradiction to the complex matrix multiplication serial operation, the additions in the log domain are operated and the 1st Jacobian operation is applied to their results in order to construct the parallel architecture.

$$c = [a^1 \quad a^2] \times \begin{bmatrix} b^1 \\ b^2 \end{bmatrix} \quad \text{[Equation 63]}$$

$$= a^1 \times b^1 + a^2 \times b^2$$

$$= \{R(+, a_r^1) + jR(+, a_i^1)\} \times \{R(+, b_r^1) + jR(+, b_i^1)\} +$$
$$\{R(+, a_r^2) + jR(+, a_i^2)\} \times \{R(+, b_r^2) + jR(+, b_i^2)\}$$

$$c = \{R(+, a_r^1)R(+, b_r^1) - R(+, a_i^1)R(+, b_i^1)\} + \quad \text{[Equation 64]}$$
$$j\{R(+, a_r^1)R(+, b_i^1) + R(+, a_i^1)R(+, b_r^1)\} +$$
$$\{R(+, a_r^2)R(+, b_r^2) - R(+, a_i^2)R(+, b_i^2)\} +$$
$$j\{R(+, a_r^2)R(+, b_i^2) + R(+, a_i^2)R(+, b_r^2)\}$$

-continued
$$c = \{R(+, a_r^1)R(+, b_r^1) - R(+, a_i^1)R(+, b_i^1) +$$
$$R(+, a_r^2)R(+, b_r^2) - R(+, a_i^2)R(+, b_i^2)\} +$$
$$j\{R(+, a_r^1)R(+, b_i^1) + R(+, a_i^1)R(+, b_r^1)\} +$$
$$R(+, a_r^2)R(+, b_i^2) + R(+, a_i^2)R(+, b_r^2)\}$$

The results of the binary logarithm applied to the real part and the imaginary part in the equation are as follows.

$$C = C_r + jC_i \quad \text{[Equation 65]}$$
$$= \log_2 c_r + j\log_2 c_i$$
$$= \log_2[\{R(+, a_r^1)R(+, b_r^1) -$$
$$R(+, a_i^1)R(+, b_i^1) + R(+, a_r^2)R(+, b_r^2) -$$
$$R(+, a_i^2)R(+, b_i^2)\}] +$$
$$j\log_2[\{R(+, a_r^1)R(+, b_i^1) +$$
$$R(+, a_i^1)R(+, b_r^1) + R(+, a_r^2)R(+, b_i^2) +$$
$$R(+, a_i^2)R(+, b_r^2)\}]$$
$$C = \log_2[\{2^{L(+, A_r^1 + B_r^1)} - 2^{L(+, A_i^1 + B_i^1)} +$$
$$2^{L(+, A_r^2 + B_r^2)} - 2^{L(+, A_i^2 + B_i^2)}\}] +$$
$$j\log_2[\{2^{L(+, A_r^1 + B_i^1)} + 2^{L(+, A_i^1 + B_r^1)} +$$
$$2^{L(+, A_r^2 + B_i^2)} + 2^{L(+, A_i^2 + B_r^2)}\}]$$

The final result, C, is obtained from the sum of the element corresponding to the A and the element corresponding to the B.

$$C = C_r + jC_i = \log_2[\{2^{L(+, C_H^j)} - 2^{L(+, C_n^j)} + 2^{L(+, C_m^1)} - 2^{L(+, C_n^1)}\}] + j\log_2[\{2^{L(+, C_w^1)} + 2^{L(+, C_n^1)} + 2^{L(+, C_w^a)} + 2^{L(+, C_n^a)}\}] \quad \text{[Equation 66]}$$

As shown in the equation, the result of the complex matrix multiplication in the log domain is composed of the addition of each element and one stage of the Jacobian operation. The calculation result of the log domain, C, is composed of the real part Cr and the imaginary part Ci. Then, the final value in the real domain can be obtained by applying the exponential (or inverse logarithm) to the real part and the imaginary part in the final value.

$$c = c_r + jc_i = 2^{C_r} + j2^{C_r} \quad \text{[Equation 67]}$$

The equation can be changed to construct the parallel Jacobian operation as follows.

$$S_M = \text{sign}(\max(C_H^1, C_w^1, C_w^2, C_n^2))$$
$$C_M = \max(C_w^1, C_n^1, C_n^2, C_n^2) \quad \text{[Equation 68]}$$

When each element is separated into the integer part and the decimal part in the equation, the calculation equation for the Jacobian operation is as follows. The equation can be given even when the number of elements of the Jacobian operation is increased to 4.

$$S_{cr} = S_M$$
$$C_r = C_{Mf} + \log_2(2^{C_{M1f} \pm 2^{-(C_{mf} - C_{m1})}} \times 2^{C_{m1f} \pm 2^{-C_{Mf} - C_{m1}}} \times 2^{C_{m1f} \pm 2^{-(C_{M1} - C_{M1})}} \times 2^{C_{m1f}}) \quad \text{[Equation 69]}$$

Here, the $C_{Mi}/C_{m1i}$ means the integer part of the $C_M/C_{m1}$, and $C_{Mf}/C_{m1f}$ means the decimal part of the $C_M/C_{m1}$. The development of the equation can be made in the imaginary part.

Figure 11:
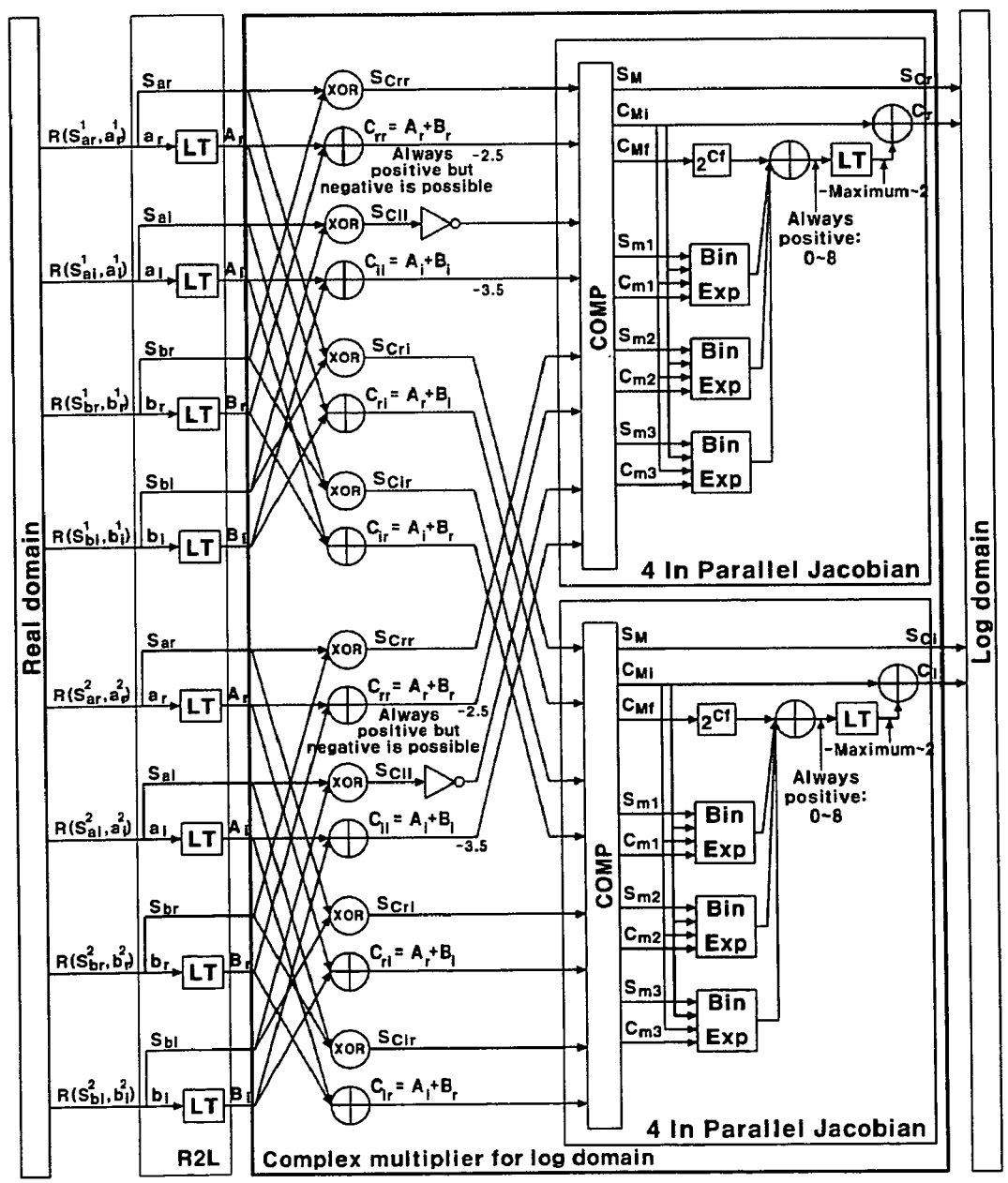
FIG. 11 shows a detailed diagram of a parallel Jacobian operation for complex matrix multiplication.

FIG. 11 shows an architecture using the modified Jacobian operation. As shown in FIG. 11, the parallel Jacobian operation is used apart from the hardware using the serial Jacobian operation.

The architecture for calculating the signs and sizes is the same with the architecture described above. However, the architecture of the Jacobian operation is parallel and thus the length of the critical path is shortened, compared with the serial architecture, as the number of stages is increased. Thus high-speed hardware can be easily designed.

Figure 12:
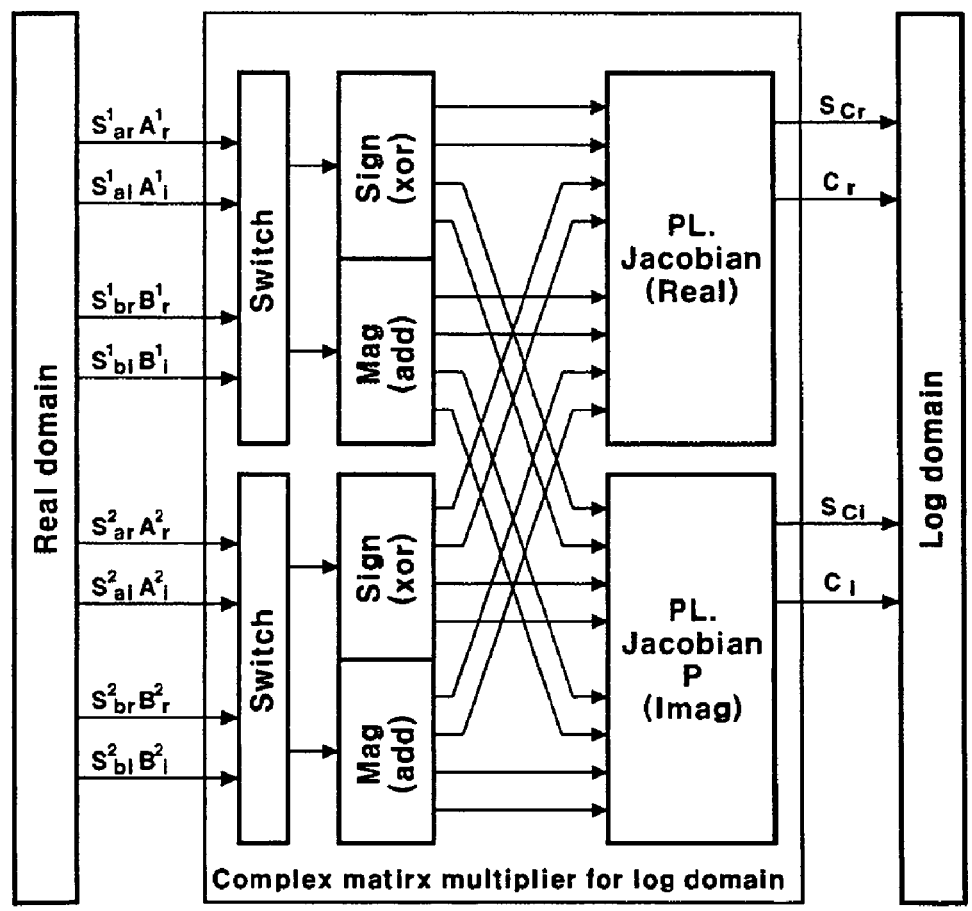
FIG. 12 shows architecture of a parallel Jacobian operation for complex matrix multiplication.

A block diagram showing the above result has the architecture including the parallel Jacobian operation as shown in FIG. 12.

The 4×4 matrix multiplication operation requires multiplication of the 1×4 matrix and 4×1 matrix 16 times. The basic architecture of the multiplication of the 1×4 matrix and 4×1 matrix is similar to that of the 1×2 matrix and 2×1 matrix described above. The equation is the same as the Equation 70, and the architecture is as in the diagram shown in FIG. 13.

$$c=[a^1 a^2 a^3 a^4] \times [b^1 b^2 b^3 b^4]^T = a^1 \times b^1 + a^2 \times b^2 + a^3 \times b^3 + a^4 \times b^4 \quad \text{[Equation 70]}$$

Complex determinant operation

For the complex matrix operation, the determinant thereof needs to be calculated, apart from the matrix addition and matrix multiplication described above.

The determinant of the 4×4 matrix can be obtained from the multiplication of 4 diagonal elements and the addition or subtraction of the results of the multiplication according to the following Equation 71.

$$c = a^{11} \times a^{22} \times a^{33} \times a^{44} \quad \text{[Equation 71]}$$
$$= \{R(+, a_r^{11}) + jR(+, a_i^{11})\} \times \cdots \times$$
$$\{R(+, a_r^{44}) + jR(+, a_i^{44})\}$$
$$= [\{R(+, a_r^{11})R(+, a_r^{22}) -$$
$$R(+, a_i^{11})R(+, a_i^{22}) +$$
$$j\{R(+, a_r^{11})R(+, a_i^{22}) +$$
$$R(+, a_i^{11})R(+, a_r^{22})\}] \times$$
$$[\{R(+, a_r^{33})R(+, a_r^{44}) -$$
$$R(+, a_i^{33})R(+, a_i^{44})\} +$$
$$j\{R(+, a_r^{33})R(+, a_i^{44}) +$$
$$R(+, a_i^{33})R(+, a_r^{44})\}]$$
$$= \{R(+, a_r^{11})R(+, a_r^{22})R(+, a_r^{33})R(+, a_r^{44}) -$$
$$R(+, a_r^{11})R(+, a_r^{22})R(+, a_i^{33})R(+, a_i^{44}) -$$
$$R(+, a_i^{11})R(+, a_i^{22})R(+, a_r^{33})R(+, a_r^{44}) +$$
$$R(+, a_i^{11})R(+, a_i^{22})$$
$$R(+, a_i^{33})R(+, a_i^{44}) -$$
$$R(+, a_r^{11})R(+, a_i^{22})R(+, a_r^{33})R(+, a_i^{44}) -$$
$$R(+, a_r^{11})R(+, a_i^{22})R(+, a_i^{33})R(+, a_r^{44}) +$$
$$j\{R(+, a_r^{11})R(+, a_r^{22})R(+, a_r^{33})R(+, a_i^{44}) +$$
$$R(+, a_r^{11})R(+, a_r^{22})R(+, a_i^{33})R(+, a_r^{44})\} -$$
$$j\{R(+, a_r^{11})R(+, a_r^{22})R(+, a_r^{33})R(+, a_i^{44}) -$$
$$R(+, a_r^{11})R(+, a_r^{22})R(+, a_i^{33})R(+, a_r^{44}) +$$

-continued
$$R(+, a_i^{11})R(+, a_i^{22})R(+, a_r^{33})R(+, a_i^{44}) -$$
$$R(+, a_i^{11})R(+, a_i^{22})R(+, a_i^{33})R(+, a_r^{44}) +$$
$$R(+, a_r^{11})R(+, a_i^{22})R(+, a_r^{33})R(+, a_r^{44}) -$$
$$R(+, a_r^{11})R(+, a_i^{22})R(+, a_i^{33})R(+, a_i^{44}) +$$
$$R(+, a_i^{11})R(+, a_r^{22})R(+, a_r^{33})R(+, a_r^{44}) -$$
$$R(+, a_i^{11})R(+, a_r^{22})R(+, a_i^{33})R(+, a_i^{44})\}$$

The result of the binary logarithm applied to the equation is as follows.

$$C = C_r + C_i \quad \text{[Equation 72]}$$
$$= \log_2 c_r + \log_2 c_i$$
$$= \log_2 \{2^{L(+, A_r^{11} + A_r^{22} + A_r^{33} + A_r^{44})} -$$
$$2^{L(+, A_r^{11} + A_r^{22} + A_i^{33} + A_i^{44})} -$$
$$2^{L(+, A_i^{11} + A_i^{22} + A_r^{33} + A_r^{44})} -$$
$$2^{L(+, a_i^{11} + A_i^{22} + A_i^{33} + A_r^{44})} -$$
$$2^{L(+, A_r^{11} + A_i^{22} + A_r^{33} + A_i^{44})} -$$
$$2^{L(+, A_r^{11} + A_i^{22} + A_i^{33} + A_r^{44})} -$$
$$2^{L(+, A_i^{11} + A_r^{22} + A_r^{33} + A_i^{44})} -$$
$$2^{L(+, A_i^{11} + A_r^{22} + A_i^{33} + A_i^{44})} +$$
$$j \log_2 \{2^{L(+, A_r^{11} + A_r^{22} + A_r^{33} + A_i^{44})} +$$
$$2^{L(+, a_r^{11} + A_r^{22} + A_i^{33} + A_r^{44})} -$$
$$2^{L(+, A_i^{11} + A_i^{22} + A_r^{33} + A_i^{44})} -$$
$$2^{L(+, A_i^{11} + A_i^{22} + A_i^{33} + A_r^{44})} +$$
$$2^{L(+, A_r^{11} + A_i^{22} + A_r^{33} + A_r^{44})} +$$
$$2^{L(+, a_r^{11} + A_i^{22} + A_i^{33} + A_i^{44})} -$$
$$2^{L(+, A_i^{11} + A_r^{22} + A_r^{33} + A_r^{44})} +$$
$$2^{L(+, a_i^{11} + A_r^{22} + A_i^{33} + A_i^{44})} -$$
$$2^{L(+, A_i^{11} + A_r^{22} + A_i^{33} + A_i^{44})}\}$$

The above equation can be embodied by the parallel Jacobian operation.

Figure 14:
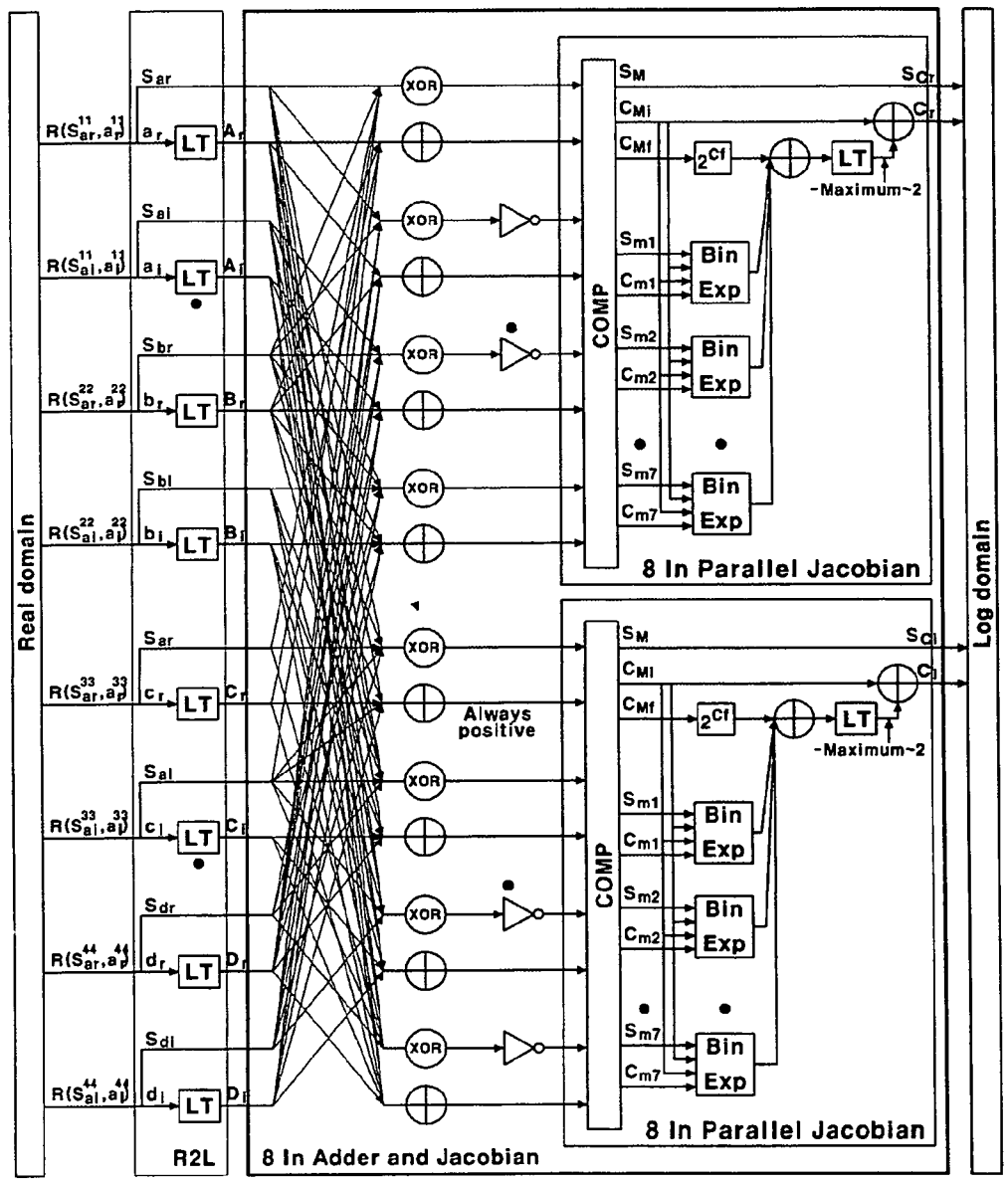
FIG. 14 shows a detailed diagram of parallel architecture for a multiplication of diagonal elements in a 4×4 complex matrix.

FIG. 14 shows a parallel architecture embodying the hardware.

As shown in FIG. 14, the real number is converted to the log domain by using the log table (LT). The additions corresponding to the multiplication in the real domain are operated, and the corresponding signs are determined.

In the same manner as with the complex matrix operation described above, the architecture for comparing the 8 elements and finding the maximum and calculating their difference is applied. Finally, the log domain can be obtained by the sum of the elements. The real part and the imaginary part are separated in the architecture.

The one element of the determinant for the 4×4 matrix is obtained by calculating the difference of the two elements among the 4 multiplication elements described above. The final result is expressed by the element of the each multiplication result as according to the following Equation 73.

$$d^1 = c^1 - c^2 = c_r^{\,1} - c_r^{\,2} + j(c_i^{\,1} - c_i^{\,2})$$

$$D^1 = \log_2(c_r^1 - c_r^2) + j\log_2(c_i^1 - c_i^2) = \log_2(2^{C_r^1} - 2^{C_r^2}) + j\log_2(2^{C_i^1} - 2^{C_i^2})$$  [Equation 73]

That is, the real part and the imaginary part are separated in the multiplier, and the Negative Jacobian operation is applied to the real part and the imaginary part separately.

In case of the 4×4 matrix, the determinant is finally obtained from sum of the 4 elements calculated above.

$$\begin{aligned} d &= d^1 + d^2 + d^3 + d^4 \\ &= d_r^1 + d_r^2 + d_r^3 + d_r^4 + \\ &\quad j(d_i^1 + d_i^2 + d_i^3 + d_i^4) \\ D &= \log_2(d_r^1 + d_r^2 + d_r^3 + d_r^4) + \\ &\quad j\log_2(d_i^1 + d_i^2 + d_i^3 + d_i^4) \\ &= \log_2(2^{D_r^1} + 2^{D_r^2} + 2^{D_r^3} + 2^{D_r^4}) + \\ &\quad j\log_2(2^{D_i^1} + 2^{D_i^2} + 2^{D_i^3} + 2^{D_i^4}) \end{aligned}$$  [Equation 74]

That is, the real part and the imaginary part are separated in the multiplier, and the positive Jacobian operation is applied to the real part and the imaginary part separately.

According to the above equations, Jacobian operation is used over 3 stages. The first Jacobian operation is for the 4 multipliers, and the second Jacobian operation is for one element in the determinant, and the final Jacobian operation is for the final determinant.

The serial Jacobian operation shown in several stages can be operated in parallel, since the Jacobian operation in the log stage is caused from the addition and subtraction in the real part. That is, the addition or subtraction can be operated in serial and in the parallel, and their properties can be given in the log domain.

For example, the final determinant can be connected to one element in the determent in serial. The serial architecture can be converted to the parallel architecture.

The Di element in the final equation can be substituted with the C element as in the following equation.

$$\begin{aligned} D &= \log_2\left(2^{\log_1\left(2^{c_r^{11}} - 2^{c_r^{12}}\right)} + 2^{\log_1\left(2^{c_r^{11}} - 2^{c_r^{12}}\right)} + \right. \\ &\quad 2^{\log_2\left(2^{c_r^{11}} - 2^{c_r^{12}}\right)} + 2^{\log_1\left(2^{c_r^{11}} - 2^{c_r^{12}}\right)} + \\ &\quad j\log_2\left(2^{\log_2\left(2^{c_r^{11}} - 2^{c_r^{12}}\right)} + 2^{\log_2\left(2^{c_r^{21}} - 2^{c_r^{22}}\right)} + \right. \\ &\quad \left.\left. 2^{\log_2\left(2^{c_r^{11}} - 2^{c_r^{12}}\right)} + 2^{\log_1\left(2^{c_r^{21}} - 2^{c_r^{22}}\right)}\right)\right) \\ &= \log_2(2^{C_r^{11}} - 2^{C_r^{12}} + 2^{C_r^{11}} - 2^{C_r^{12}} + \\ &\quad 2^{C_r^{11}} - 2^{C_r^{12}} + 2^{C_r^{11}} - 2^{C_r^{12}}) + \\ &\quad j\log_2(2^{C_r^{11}} - 2^{C_r^{12}} + 2^{C_r^{21}} - 2^{C_r^{22}} + \\ &\quad 2^{C_r^{11}} - 2^{C_r^{12}} + 2^{C_r^{11}} - 2^{C_r^{12}}) \end{aligned}$$  [Equation 75]

Figure 15:
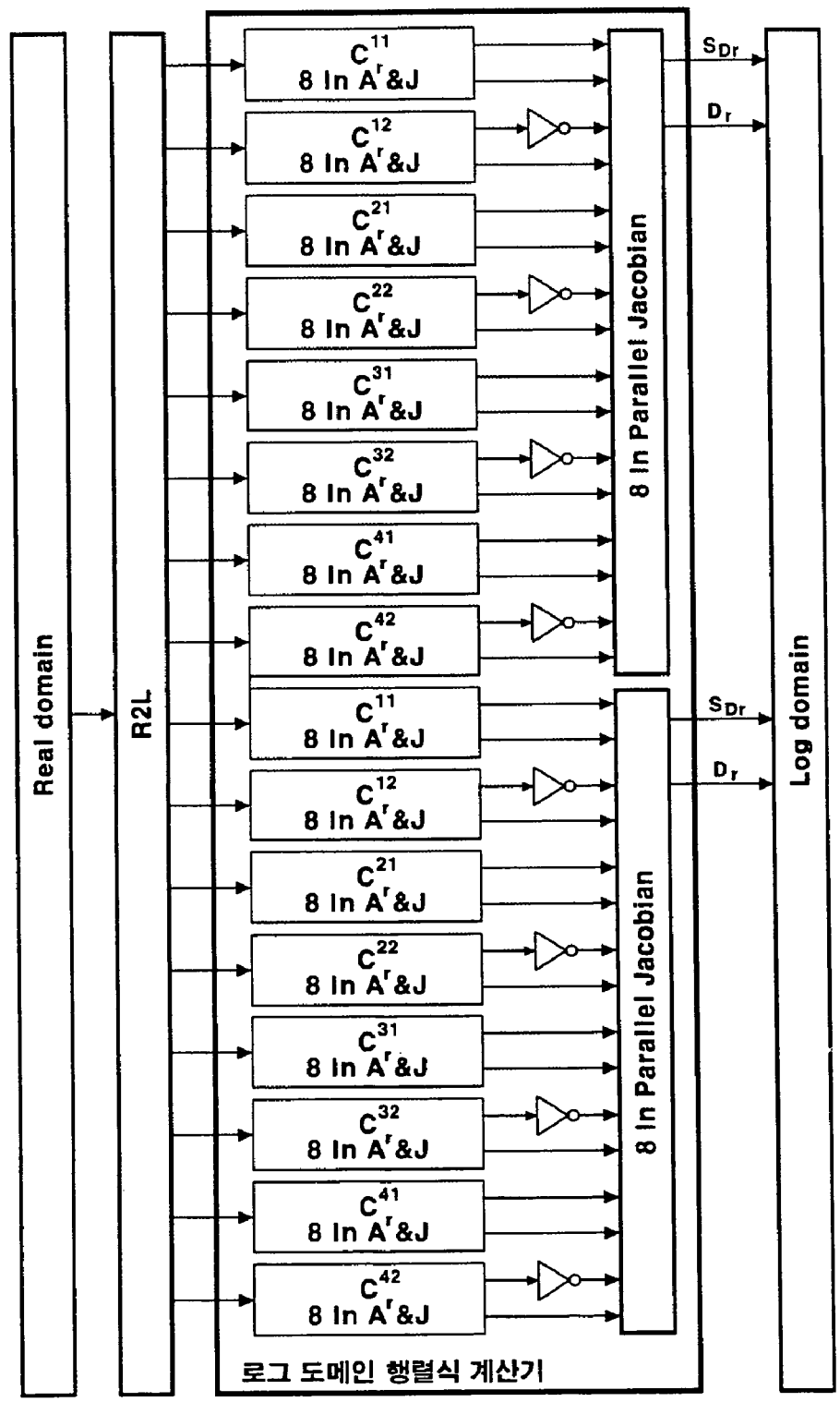
FIG. 15 is a block diagram for calculating a determinant of a 4×4 complex matrix.

As shown in the equation, the final determinant can be directly expressed by the outputs of the 4 multipliers, and can be converted to the parallel architecture as shown in FIG. 15.

This property is generally shown in the Jacobian operation. Thus, the serial architecture and the parallel architecture can be selected according to the requirement of the hardware.

VI Application to the V-BLAST decoder

To embody the V-BLAST in the real domain, a number of the multipliers are required even when the channel transfer function is the 4×4 matrix. Thus a large amount of hardware is required. Therefore, the present invention converts the V-BLAST operation to the operation in the log domain based on mathematical grounds. The V-BLAST operation can be simply performed.

Figure 16:
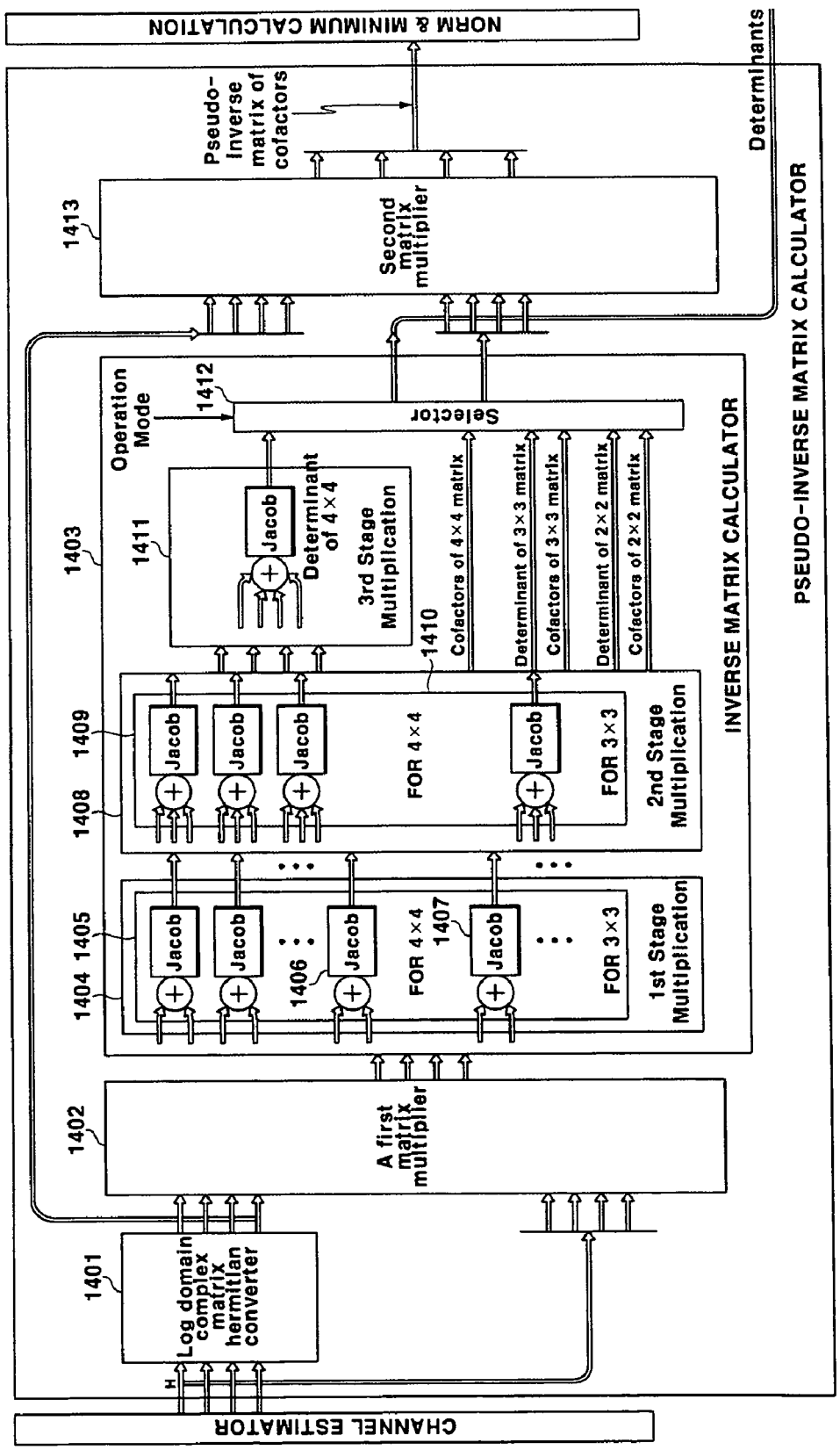
FIG. 16 shows a construction of a pseudo inverse matrix calculator 1300 according to a first exemplary embodiment of the present invention.

FIG. 16 shows a construction of a pseudo inverse matrix calculator 1300 according to the first exemplary embodiment of the present invention.

As shown in FIG. 16, the pseudo inverse matrix calculator 1300 according to the first exemplary embodiment can be embodied by using the log domain complex matrix multiplier and the log domain complex multiplier described above.

The pseudo inverse matrix calculator 1300 includes a log domain complex matrix Hermitian converter 1401, a first matrix multiplier 1402 for performing the complex matrix addition operation (multiplication in the real domain) in the log domain, and an inverse matrix calculator 1403 and a second matrix multiplier 1413 for performing the complex matrix addition operation in the log domain.

The Hermitian converter 1401 receives channel information, matrix H, and separates the matrix H into the real part and the imaginary part. Further, the Hermitian converter 1401 applies logarithmic conversion to the real part and the imaginary part to convert them to the log domain. To take the Hermitian matrix is the same as the operation in the real part, and thus the sign of the Hermitian matrix is rolled over, and the result is transposed.

The first matrix multiplier 1402 receives the Hermitian matrix $H^H$ outputted from the Hermitian converter 1401, and performs the multiplication of the Hermitian matrix $H^H$ in the real domain and the original matrix H by using the addition operation in the log domain and the Jacobian operation as described in the complex matrix multiplication. The result becomes a square matrix and is transferred to the inverse matrix calculator 1403 for the square matrix.

The inverse matrix 1403 includes a first multiplying unit 1404, a second multiplying unit 1408, a third multiplying unit 1411, and a selector 1412.

The multiplication operation for the two complex numbers is operated in the first multiplying unit 1404. That is, the first multiplying unit 1404 includes a first 4×4 multiplying unit 1405 and a first 3×3 multiplying unit 1407. The operations for a 2×2 matrix are repeated in the operations for the 4×4 matrix or the 3×3 matrix, and the separate 2×2 multiplying unit may not be included. The basic construction of this operation is composed of the adder and Jacobian operation. Thus the addition operations are performed in the log domain and the Jacobian operation 1406 is applied to the results of the addition operation. Also, the cofactors for the 2×2 matrix determinant and the 3×3 matrix can be found here.

The multiplication operation for the two complex numbers is also operated in the second multiplying unit 1408. That is, the second multiplying unit 1408 includes a second 4×4 multiplying unit 1409 and a second 3×3 multiplying unit 1410.

In the view of the real domain, three complex numbers are multiplied and the results of the multiplication are summed. Thus, the second 4×4 multiplying unit 1409 receives the output of the first 4×4 multiplying unit 1405 and produces the cofactors of the 4×4 matrix, and the second 3×3 multiplier 1410 receives the output of the first 3×3 multiplying unit 1406 and finds the determinant of the 3×3 matrix.

In the second multiplying unit 1408, the addition operations for the complex number inputted are performed in the log domain and the Jacobian operation is applied to the results of the addition operation. Thus, the second multiplying unit can be embodied by using an operator having a type similar to the first multiplier.

The third matrix multiplying unit 1411 receives output from the second 4×4 multiplying unit 1410, and outputs the determinant of the 4×4 matrix. The third matrix multiplying unit 1411 performs the multiplication of the 4 complex number and the addition of the result of the multiplication, by using the addition operation in the log domain and applying the Jacobian operation to the results of the addition operation. As a result, the determinant of the 4×4 matrix can be obtained.

The selector 1412 receives the cofactor matrix and determinants of the 4×4, 3×3, or 2×2 matrix, and selects the cofactor matrix and determinant corresponding to the operation mode. That is, the cofactor and determinant of the 4×4 matrix, the 3×3 matrix, or the 2×2 matrix can be outputted by the selector 1412.

The selected cofactors and determinant are outputs of the inverse matrix calculator 1403. That is, the determinant is transferred to the subtractor 1306, and the cofactors are transferred to the second matrix multiplier 1413.

The second multiplier 1413 multiplies the cofactor matrix outputted from the selector 1413 by the Hermitian matrix outputted from the first matrix multiplier 1401. The second multiplier 1413 outputs the pseudo inverse matrix composed of the cofactors.

The second matrix multiplier 1413 performs the multiplication of the Hermitian matrix $H^H$ and the original matrix H in the real domain by using the addition operation in the log domain and the Jacobian operation by the same method as with the first matrix multiplier 1403. The pseudo inverse matrix composed of the cofactors is inputted to a norm & minimum calculator 1301

Figure 17:
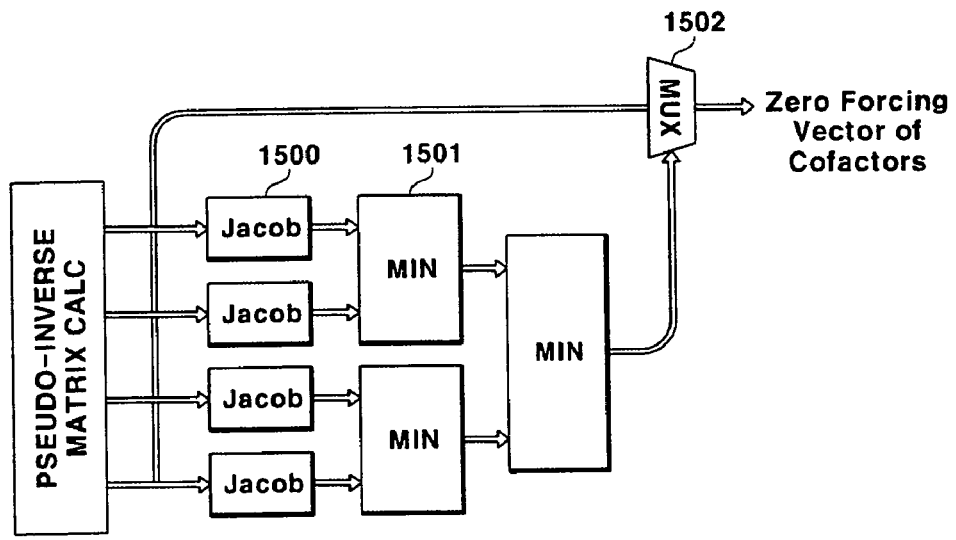
FIG. 17 shows a construction of a norm & minimum calculator 1301 for calculating a norm and finding a zero forcing vector.

FIG. 17 shows a construction of a norm & minimum calculator 1301 for calculating the norm and finding a zero forcing vector.

When the pseudo inverse matrix is obtained, the row having the smallest norm is used as the zero forcing vector. In the case of the real domain, the norm can be obtained by summing the elements squared in each row.

However, in the case of the log domain, the norm can be obtained by duplicating the elements and performing a Jacobian operation on the result. But to duplicate the elements causes the same effect as does a one bit shift to the left, and this operation is applied to all elements, and the relative size of all elements is concerned. Thus such duplication of the element is not required in practice.

To find the zero forcing vector in the log domain, the Jacobian operator 1500 performs a Jacobian operation to each transferred row, and a minimum unit 1501 receives the result of the Jacobian operation and finds the row having the minimum, which is outputted through the multiplexer 1503.

Figure 18:
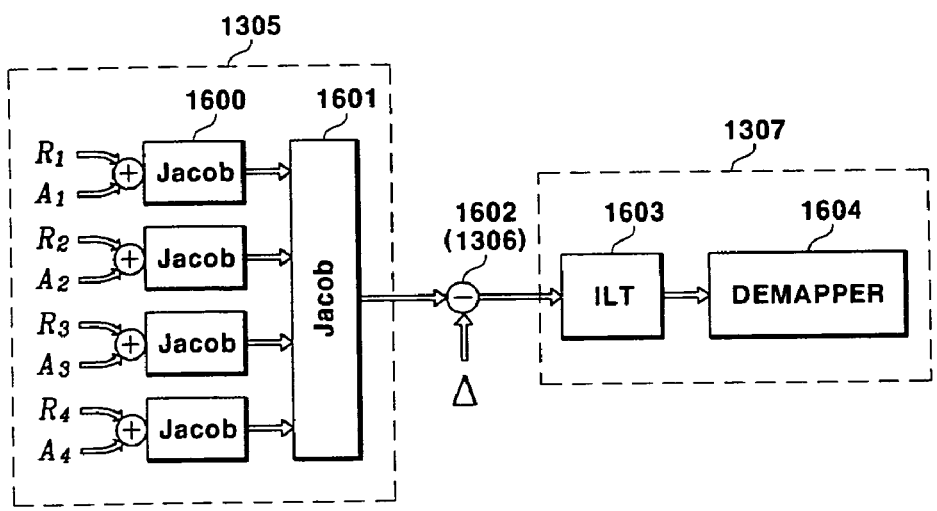
FIG. 18 shows detailed operation processes in an adder 1305, a subtractor 1306, and a demapper 1307.

FIG. 18 shows a detailed operation process, a decision statistic of an adder 1305, a subtractor 1306, and a demapper 1307.

The adder 1305 adds the received symbol R through the switch 1310 to the zero forcing vector A outputted from the zero forcing vector selector 1302.

The subtractor 1306 subtracts the determinant Δ from the output of the adder 1305.

When the decision statistic is calculated in the real domain by using the received symbol and the zero forcing vector, the result of the multiplication of the received symbol and the cofactors are summed, and the sum of the result is divided by the determinant. However, in the log domain, the received symbols are converted to the log domain, the converted symbols are added to the element in the zero forcing vector, and Jacobian operations 1600 and 1601 are performed. Then the decision statistic can be obtained by subtracting the determinant 1602 from the results.

The operation result from the adder 1305 and the subtractor 1306 are inputted to the demapper 1307. The inverse log converter 1603 applies inverse logarithmic conversion to the operation result in the real domain by using the inverse log table, and the demapper 1604 decodes the values in the real domain to the desired symbol.

Next, the second exemplary embodiment of the present invention is described with reference to FIGS. 19 and 20.

Figure 19:
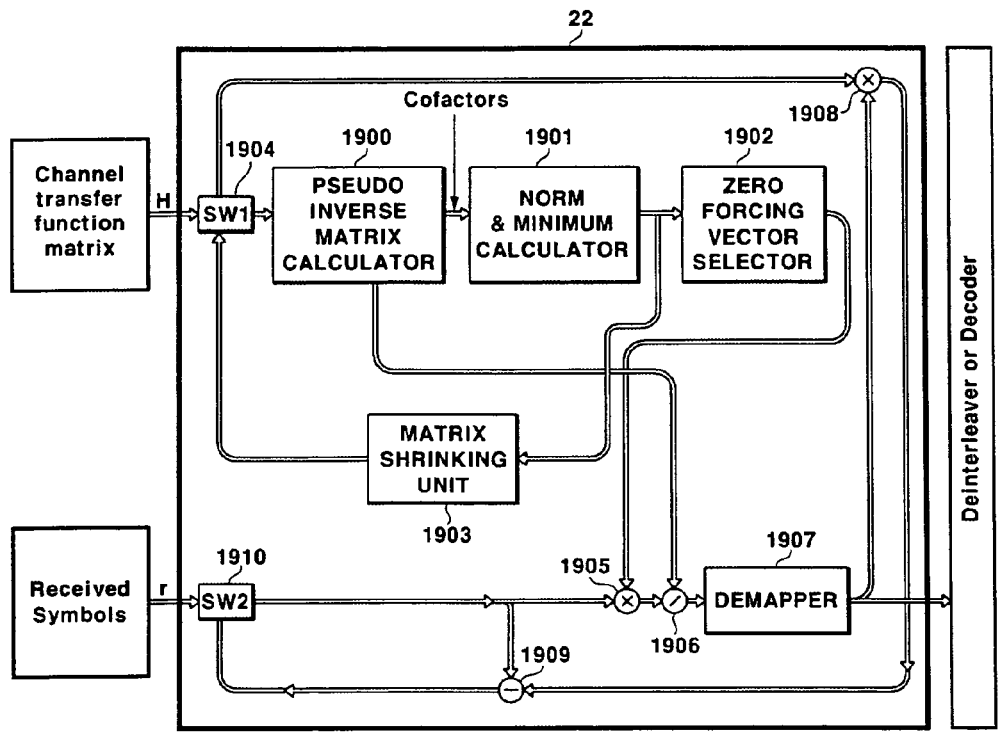
FIG. 19 shows a construction of a V-BLAST system according to a second exemplary embodiment of the present invention.

FIG. 19 shows a construction of a V-BLAST system according to a second exemplary embodiment of the present invention.

As shown in FIG. 19, when the channel transfer function matrix H including the channel information is inputted, the pseudo inverse matrix calculator 1900 calculates the pseudo inverse matrix from the H matrix. The determinant, which is not a perfect inverse matrix, and the cofactors are separately obtained from the pseudo inverse matrix calculator 1900. The determinant is used in dividing the result of multiplication 1905 of the minimum cofactor and the received symbol, and the division causes the same effect as with the multiplication of a weight vector (such as a zero forcing vector).

The norm and minimum of the cofactors obtained from the pseudo inverse matrix calculator 1900 are calculated, and the minimum index is obtained. The row corresponding to the minimum index is selected from the rows of the matrix composed of the cofactors, and the row is multiplied by the received symbol. The minimum index is transferred to a matrix shrinking unit 1903. The matrix shrinking unit makes a new matrix of which a column corresponding to the minimum index is canceled from the present matrix.

Next, calculation is performed by using the newly-made matrix, and is controlled by the switch 1 1904.

The demapper 1907 receives the result of dividing the result of multiplication of the cofactor and the received symbol by the determinant and decodes the result to the first symbol. The decoded symbols are transferred to a deinterleaver or a decoder. When the symbols obtained from the demapper are multiplied by the column corresponding to the minimum index in the channel information matrix, the symbols corresponding to minimum elements among symbols received at each antenna are regenerated. When the symbols are subtracted from the received symbols, new symbols in which the minimum element is canceled can be obtained.

Figure 20:
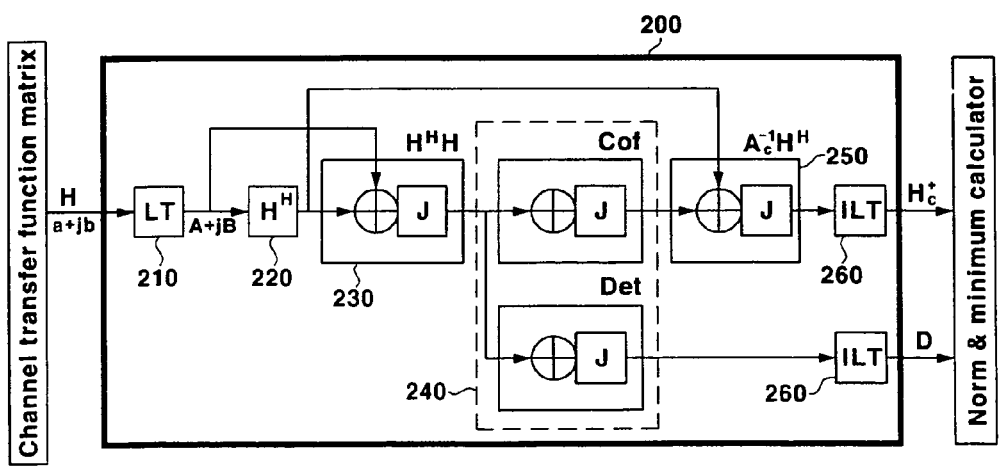
FIG. 20 shows a construction of a pseudo inverse matrix calculator 200 according to a second exemplary embodiment of the present invention.

FIG. 20 shows a construction of the pseudo inverse matrix calculator 1900 shown in FIG. 19.

As shown in FIG. 20, the pseudo inverse matrix calculator 1900 comprises a log converter 210, a Hermitian converter 220, a matrix multiplier 230, an inverse matrix multiplier 240, a pseudo inverse matrix calculator 250, and an inverse log converter 260.

The log converter 210 converts the channel transfer function matrix H to the log domain by using the log table.

The Hermitian converter 220 obtains the Hermitian matrix $H^H$ of the matrix H converted to the log domain.

The matrix multiplier 230 produces the multiplication matrix A of the Hermitian matrix and the channel transfer function matrix.

The inverse matrix multiplier 240 finds the inverse matrix $A^{-1}$ of the multiplication matrix.

The pseudo inverse matrix calculator 250 produces the cofactors and the determinants in producing the pseudo inverse matrix by multiplying the inverse matrix by the Hermitian matrix.

The inverse log converter converts the cofactors and the determinants to the real domain by using the inverse log table.

Here, the process for obtaining the pseudo inverse matrix in the log domain is described.

First, with respect to the log table, the input matrix H is separated into the real part and the imaginary part, and the logarithmic conversion is applied to the real part and the imaginary part so that the matrix H is converted to the log domain. For example, when the input matrix H is a 4×4 matrix generally including 4 complex numbers, 8 converters are needed. The number of converters can be reduced depending on the construction.

With respect to the Hermitian matrix, to obtain the Hermitian matrix of the logarithmic conversion values done the same way as with the operation in the complex domain. Thus, thus the sign of the imaginary part is rolled over, and the result is transposed.

The multiplication of the Hermitian matrix $H^H$ and the original matrix H in the real domain can be easily performed by using the addition operation in the log domain and the Jacobian operation as described in the complex matrix multiplication. The method for finding the determinant in the log domain is described in the complex determinant operation.

The cofactors of the 4×4 matrix can be obtained by calculating the transposed matrix from the determinant of the 3×3 matrix. The determinant of the 3×3 matrix is a part of the determinant of the 4×4 matrix as shown in FIG. 15, and thus the determinant of the 3×3 matrix can be easily found.

Figure 13:
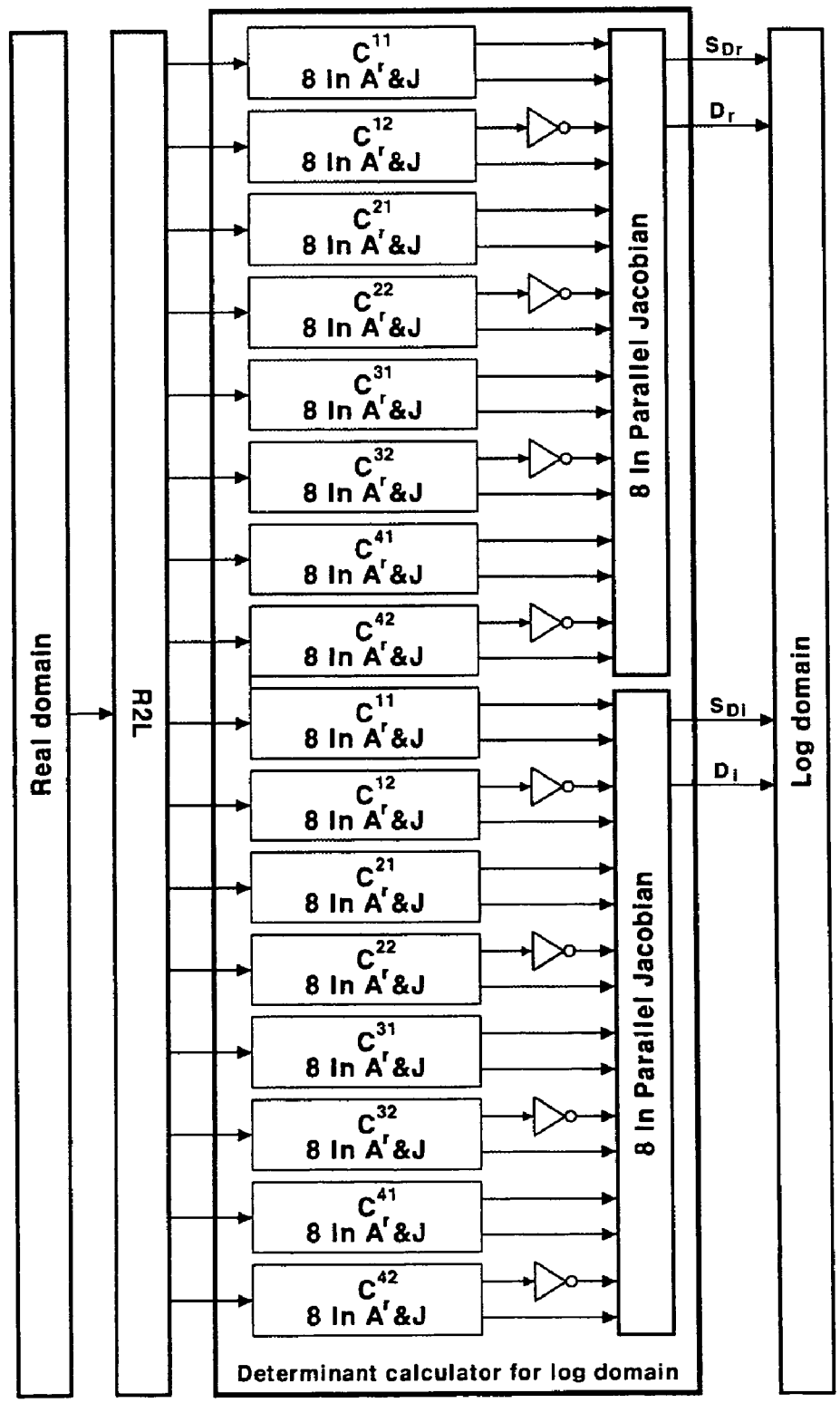
FIG. 13 is a block diagram of parallel architecture for multiplication of 1×4 matrix and a 4×1 matrix in a complex matrix.

The matrix multiplication of the cofactors and the Hermitian matrix in the log domain can be embodied as shown in FIG. 13. The basic architecture is composed of the adder and the Jacobian operation.

The result is separated into the real part and the imaginary part, and the inverse matrix of the cofactor Hc+ can be obtained from converting the real part and the imaginary part by using the inverse log table.

Although the exemplary embodiments relate to the pseudo inverse matrix, the present invention can be applied to other matrix operations apart from the channel transfer function matrix.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

The V-BLAST system according to the present invention cancels the repeated parts in the operation process, and operates the necessary cofactors by using the 3 stages of the multiplication. The V-BLAST system finds the minimum by using the cofactors, and multiplies the cofactors by the received symbol and divides the result of the multiplication by the determinant. Thus the V-BLAST system can locate the division by the determinant to the latter part of the operation, and thus can remarkably reduce the amount of hardware for embodying the algorithm.

Further, the V-BLAST system does not perform operations in the real domain requiring a number of the multipliers, but converts the operations in the real domain to operation in the log domain by applying the binary logarithmic conversion. Therefore, the V-BLAST system uses the simple addition operation and the Jacobian operation, that is, the positive Jacobian operation and the negative Jacobian operation. Thus, the V-BLAST system can embody an effective process for the channel transfer function matrix.

In addition, the V-BLAST system uses the simple addition operation and the Jacobian operation, and can embody the pseudo inverse matrix calculator with simpler hardware.

What is claimed is:

1. A pseudo inverse matrix calculator for producing a pseudo inverse matrix of an input matrix, comprising:
   a Hermitian converter for finding a logarithmic converted matrix by using a predetermined log table and finding a Hermitian matrix $H^H$ of the logarithmic converted matrix;
   a first multiplier for producing a multiplication matrix of the Hermitian matrix and the logarithmic converted matrix by using an operation in a log domain and a Jacobian operation;
   an inverse matrix calculator for producing a cofactor and a determinant of an inverse matrix for the multiplication matrix by using the operation in a log domain and a Jacobian operation; and
   a second multiplier for producing a pseudo inverse matrix of the cofactor, based on the cofactor for the inverse matrix and the Hermitian matrix $H^H$ by using the operation in a log domain and a Jacobian operation.

2. The pseudo inverse matrix calculator of claim 1, wherein the inverse matrix calculator comprises:
   a first multiplying unit for performing an operation to the multiplication matrix outputted from the first multiplier by using the operation in a log domain and a Jacobian operation;
   a second multiplying unit for performing an operation to the output from the first multiplying unit by using the operation in a log domain and a Jacobian operation and producing cofactor matrixes and determinants;
   a third multiplying unit for performing an operation to the output from the second multiplying unit by using the operation in a log domain and a Jacobian operation and producing cofactor matrixes and determinants; and
   a selector for selecting the cofactor matrix and the determinant from the cofactor matrixes and the determinants outputted from the first multiplying unit, the second multiplying unit, and the third multiplying unit, by using the predetermined control signal.

3. The pseudo inverse matrix calculator of claim 2, wherein the first multiplying unit comprises:
   a first 4×4 matrix multiplier for performing a multiplication operation to a 4×4 matrix and producing a cofactor and determinant of a 2×2 matrix; and
   a first 3×3 matrix multiplier for performing a multiplication operation to a 3×3 matrix and producing a cofactor of the 3×3 matrix.

4. The pseudo inverse matrix calculator of claim 2, wherein the second multiplying unit comprises:
   a second 4×4 matrix multiplier for receiving an output from the first 4×4 matrix multiplier, and producing a cofactor of the 4×4 matrix; and
   a second 3×3 matrix multiplier for receiving an output from the first 3×3 matrix multiplier, and producing a determinant of the 3×3 matrix.

5. The pseudo inverse matrix calculator of claim 2, wherein the third multiplying unit receives an output from the second multiplying unit and produces a determinant of the 4×4 matrix.

6. A pseudo inverse matrix calculator for producing a pseudo inverse matrix of a channel transfer function matrix H, comprising:
   a log converter for applying logarithmic conversion to the channel transfer function matrix by using a predetermined log table;

a producer for producing a pseudo inverse matrix H+ for the logarithmic converted channel transfer function matrix; and an inverse log converter for applying inverse logarithmic conversion to the pseudo inverse matrix produced from the producer by using a predetermined inverse log table, wherein the inverse log converter comprises:

a first inverse log converter for applying inverse logarithmic conversion to a cofacter Hc+ of the pseudo inverse matrix; and a second inverse log converter for applying inverse logarithmic conversion to a determinant D of the pseudo inverse matrix.

7. The pseudo inverse matrix calculator of claim 6, wherein the producer comprises:

a Hermitian converter for finding a Hermitian matrix $H^H$ of a logarithmic converted channel transfer function matrix H;

a matrix multiplier for producing a multiplication matrix A by using the Hermitian matrix $H^H$ and the logarithmic converted channel transfer function matrix;

an inverse matrix multiplier for finding an inverse matrix $A^{-1}$ of the multiplication matrix; and a pseudo inverse matrix unit for producing the pseudo inverse matrix by using the inverse matrix $A^{-1}$ and the Hermitian matrix $H^H$.

8. The pseudo inverse matrix calculator of claim 7, wherein the inverse matrix multiplier produces a cofactor and a determinant of the inverse multiplication matrix by using the addition operation and a Jacobian operation for the multiplication matrix.

9. The pseudo inverse matrix calculator of claim 7, wherein the pseudo inverse matrix unit produces a cofactor Hc+ of the pseudo inverse matrix by using the addition operation of the cofactor and the Hermitian matrix $H^H$ and a Jacobian operation; and produces a determinant D of the pseudo inverse matrix by using the addition operation of the determinant and the Hermitian matrix $H^H$ and a Jacobian operation.

10. The pseudo inverse matrix calculator of claim 7, wherein the matrix multiplier performs the addition operation of the logarithmic converted matrix and the Hermitian matrix and a Jacobian operation; and produces the multiplication matrix.

11. A channel transfer function matrix processing method executed on a decoder in a receiver of a multi-input multi-output (MIMO) communication system, comprising:

logarithmic converting a channel transfer function matrix H including communication channel information by using a predetermined log table;

producing a pseudo inverse matrix of the logarithmic converted channel transfer function matrix H, wherein producing a pseudo inverse matrix comprises:

finding a Hermitian matrix $H^H$ of the logarithmic converted channel transfer function matrix H;

producing a multiplication matrix A by using an addition operation of the log converted matrix and the Hermitian matrix $H^H$ and a Jacobian operation;

finding an inverse multiplication matrix $A^{-1}$ for the multiplication matrix; and, producing the pseudo inverse matrix by using the addition operation of the inverse multiplication matrix $A^{-1}$ and the Hermitian matrix $H^H$ and a Jacobian operation; and inverse logarithmic converting the pseudo inverse matrix produced by using a predetermined inverse log table.

12. The channel transfer function matrix processing method of claim 11, wherein the stage for finding the inverse multiplication matrix produces a cofactor and a determinant for the inverse matrix $A^{-1}$ by using the addition operation of the multiplication matrix and a Jacobian operation.

13. The channel transfer function matrix processing method of claim 11, wherein the stage for producing the pseudo inverse matrix comprises:

producing a cofactor Hc+ for the pseudo inverse matrix by using the addition operation of the cofactor and the Hermitian matrix $H^H$ and a Jacobian operation; and producing a determinant D for the pseudo inverse matrix by using the addition operation of the determinant and the Hermitian matrix $H^H$ and a Jacobian operation.

14. A vertical Bell Laboratories layered space-time (V-BLAST) system for a multi-input multi-output (MIMO) communication system, comprising:

a pseudo inverse matrix calculator for receiving a channel transfer function matrix including channel information and producing a cofactor matrix and a determinant of a pseudo inverse matrix by using an operation in a log domain and a Jacobian operation;

a norm & minimum calculator for calculating a minimum index for the cofactor matrix outputted from the pseudo inverse matrix calculator;

a weight vector selector for selecting a row vector having the minimum index outputted from the norm & minimum calculator and calculating a transposed matrix for the row vector;

an adder for adding the transposed matrix outputted from the weight vector selector to a received input symbol by using an operation in a log domain and a Jacobian operation;

a subtractor for receiving the output from the adder and the determinant from the pseudo inverse matrix calculator and subtracting the determinant from the output; and a demapper for receiving the output from the subtractor and performing a predetermined function operation to the output and producing estimated information.

15. The V-BLAST system claim 14, wherein the pseudo inverse matrix calculator comprises:

a Hermitian converter for applying logarithmic conversion to the matrix by using a predetermined log table and finding a Hermitian matrix $H^H$ of the logarithmic converted matrix;

a first multiplier for producing a multiplication matrix of the Hermitian matrix and the logarithmic converted matrix by using an operation in a log domain and a Jacobian operation;

an inverse matrix calculator for producing a cofactor and a determinant for an inverse matrix of the multiplication matrix by using the operation in a log domain and a Jacobian operation; and a second multiplier for producing a pseudo inverse matrix of the cofactor, based on the cofactor for the inverse matrix and the Hermitian matrix $H^H$ by using the operation in a log domain and a Jacobian operation.

16. The V-BLAST system of claim 15, wherein the inverse matrix calculator comprises:

a first multiplying unit for performing an operation to the multiplication matrix outputted from the first multiplier by using the operation in a log domain and a Jacobian operation;

a second multiplying unit for performing an operation to the output from the first multiplying unit by using the operation in a log domain and a Jacobian operation and producing cofactor matrixes and determinants;

a third multiplying unit for performing an operation to the output from the second multiplying unit by using the operation in a log domain and a Jacobian operation and producing cofactor matrixes and determinants; and a selector for selecting the cofactor matrix and the determinant from the cofactor matrixes and the determinants outputted from the first multiplying unit, the second multiplying unit, and the third multiplying unit, by the predetermined control signal.

17. The V-BLAST system of claim 14, wherein the norm & minimum calculator comprises:

a Jacobian operator for performing a Jacobian operation to the cofactor matrix outputted from the pseudo inverse matrix calculator; and a minimum selector for receiving the output from the Jacobian operator and selecting a row having a minimum.

18. The V-BLAST system of claim 14, wherein the demapper comprises:

an inverse log converter for applying inverse logarithmic conversion to the output from the subtractor; and an demapper for performing the predetermined function operation to the output from the inverse log converter and producing the estimated information.

* * * * *